US009139053B2

(12) United States Patent
Kosugi et al.

(10) Patent No.: US 9,139,053 B2
(45) Date of Patent: Sep. 22, 2015

(54) TIRE POSITION DETERMINATION SYSTEM AND TIRE PRESSURE MONITORING SYSTEM

(71) Applicant: KABUSHIKI KAISHA TOKAI RIKA DENKI SEISAKUSHO, Aichi (JP)

(72) Inventors: Masanori Kosugi, Aichi (JP); Taketoshi Sakurai, Aichi (JP); Katsuhide Kumagai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 11 days.

(21) Appl. No.: 14/136,574

(22) Filed: Dec. 20, 2013

(65) Prior Publication Data

US 2014/0184403 A1   Jul. 3, 2014

(30) Foreign Application Priority Data

Dec. 27, 2012  (JP) .................. 2012-286286
Jun. 3, 2013   (JP) .................. 2013-116984
Sep. 13, 2013  (JP) .................. 2013-190709

(51) Int. Cl.
*B60C 23/00*   (2006.01)
*B60C 23/04*   (2006.01)

(52) U.S. Cl.
CPC ......... *B60C 23/0415* (2013.01); *B60C 23/0416* (2013.01); *B60C 23/0489* (2013.01)

(58) Field of Classification Search
CPC ............ B60C 23/0416; B60C 23/0415; B60C 23/0408; B60C 23/0489; B60C 23/0488
USPC ..................... 340/442, 447; 73/146.2, 146.5
See application file for complete search history.

(56) References Cited

U.S. PATENT DOCUMENTS

| 7,253,726 B2 | 8/2007 | Okubo |
| 2006/0055524 A1 | 3/2006 | Okubo |

(Continued)

FOREIGN PATENT DOCUMENTS

| DE | 10238571 | 3/2004 |
| DE | 102011004561 | 8/2012 |
| JP | 2006-062516 | 3/2006 |

(Continued)

OTHER PUBLICATIONS

U.S. Appl. No. 14/136,139 to Masanori Kosugi et al., filed Dec. 20, 2013.

(Continued)

*Primary Examiner* — Thomas Mullen
(74) *Attorney, Agent, or Firm* — Greenblum & Bernstein P.L.C.

(57) ABSTRACT

Each tire pressure detector detects a characteristic point in a detection signal of an acceleration sensor indicating that the tire pressure detector is located at a certain rotation position. When detecting the characteristic point, the tire pressure detector transmits a notification signal including the detector ID. Whenever a receiver receives a notification signal, the receiver acquires an axle rotation amount of a representative wheel and stores the axle rotation amount in a memory in association with the detector ID in the notification signal. After acquiring axle rotation amounts associated with the detector IDs of all of the tire pressure detectors, the receiver determines mounting positions of tires from the angle each tire pressure detector rotated and the angle each axle rotated between a first determination timing and a second determination timing.

25 Claims, 22 Drawing Sheets

(56) References Cited

U.S. PATENT DOCUMENTS

2013/0169428 A1    7/2013    Shima et al.
2013/0327136 A1    12/2013   Kretschmann

FOREIGN PATENT DOCUMENTS

| | | |
|---|---|---|
| JP | 2012-126341 | 7/2012 |
| WO | 2005/069993 | 8/2005 |
| WO | 2012/157306 | 11/2012 |

OTHER PUBLICATIONS

U.S. Appl. No. 14/107,617 to Masanori Kosugi et al., filed Dec. 16, 2013.
U.S. Appl. No. 14/030,550 to Masanori Kosugi, filed Sep. 18, 2013.
Search report from European Patent Office (EPO), mail date is Mar. 7, 2014.

Fig.14

1st Determination Timing t1

| | Receive ID1 | Receive ID2 | Receive ID3 | Receive ID4 |
|---|---|---|---|---|
| Axle Rotation Amount C1 | C1-11 | C1-12 | C1-13 | C1-14 |
| C2 | C2-11 | C2-12 | C2-13 | C2-14 |
| C3 | ... | ... | ... | C3-14 |
| C4 | ... | ... | ... | C4-14 |
| Position of Tire Pressure Detector | | | | |

⇒ Calculate Detector Angle $\theta_{k1}$ for ID1 to ID3 ($\theta_{k1}$ for ID4 is reference or 0)

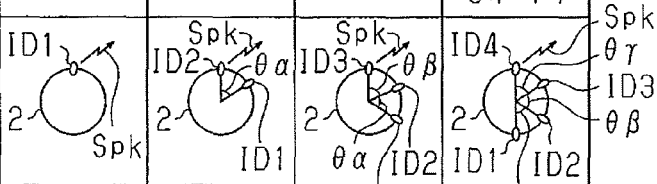

— Calculate Axle Rotation Angle $\theta_b$ Between T1, T2

~ Calculate Detector Rotation Angle $\theta_a$ Between T1, T2

2nd Determination Timing t2

| | Receive ID1 | Receive ID2 | Receive ID3 | Receive ID4 |
|---|---|---|---|---|
| Axle Rotation Amount C1 | C1-21 | C1-22 | C1-23 | C1-24 |
| C2 | C2-21 | C2-22 | C2-23 | C2-24 |
| C3 | ... | ... | ... | C3-24 |
| C4 | ... | ... | ... | C4-24 |
| Position of Tire Pressure Detector | | | | |

⇒ Calculate Detector Angle $\theta_{k2}$ for ID1 to ID3 ($\theta_{k1}$ for ID4 is reference or 0)

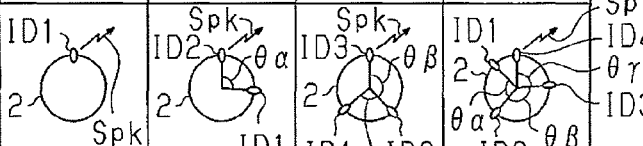

Fig.19
| | Axle Rotation Amount at t11 | Axle Rotation Amount at t12 | .... |
|---|---|---|---|
| ID1 | 20 | 19 | |
| ID2 | 40 | 42 | .... |
| ID3 | 60 | 58 | |
| ID4 | 70 | 71 | |
| Position of Tire Pressure Detector | 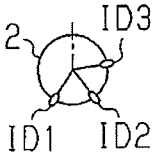 | 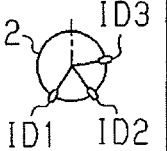 | .... |
t1
↕ Unsuccessful Position Determination ↕ Successful Position Determination
| | Axle Rotation Amount at t21 | Axle Rotation Amount at t22 | .... |
|---|---|---|---|
| ID1 | ... | ... | |
| ID2 | ... | ... | .... |
| ID3 | ... | ... | |
| ID4 | ... | ... | |
| Position of Tire Pressure Detector | 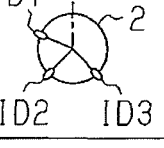 | 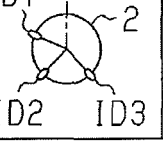 | .... |
t2
Fig.20
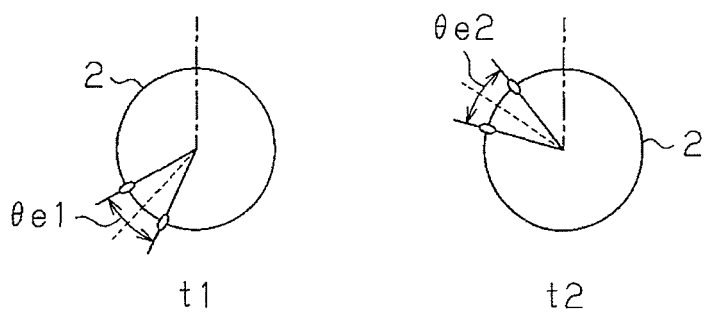
t1        t2

| Detector Rotation Angle θa (Degrees) | Axle Rotation Angle θb (Degrees) |
|---|---|
| ID1 : 0 | FR : 0 |
| ID2 : 45 | FL : 30 |
| ID3 : 20 | RL : 10 |
| ID4 : 90 | RR : 120 |

|  | ID1 | ID2 | ID3 | ID4 |
|---|---|---|---|---|
| Angle at t1 | 150° | 0° | — | — |
| Angle at t2 | 45° | 90° | 0° | 200° |
| Rotation Angle Between t1 and t2 | 255° | 90° | — | — |

After Single Tire Rotation ⇒

|  | ID3 | ID4 |
|---|---|---|
| t1 + Angle of Single Tire Rotation | 360° + 80° | 360° + 200° |
| Angle at t2 | 0° | 200° |
| Rotation Angle Between t1 and t2 | 280° | 0° |

TIRE POSITION DETERMINATION SYSTEM AND TIRE PRESSURE MONITORING SYSTEM

CROSS-REFERENCE TO RELATED APPLICATIONS

This application is based upon and claims the benefit of priority from prior Japanese Patent Application Nos. 2012-286286, filed on Dec. 27, 2012, 2013-116984, filed on Jun. 3, 2013, and 2013-190709, filed on Sep. 13, 2013, the entire contents of which are incorporated herein by reference.

BACKGROUND

The present invention relates to a tire position determination system that determines the position of a tire with a detection signal from a tire pressure detector.

A vehicle may include a tire pressure monitoring system. In a tire pressure monitoring system, a tire pressure detector that is attached to a tire directly detects the pressure of the tire and transmits, through wireless communication, a detection signal to a receiver that is arranged on a vehicle body. Preferably, the tire pressure monitoring system notifies the driver of where a tire having low pressure is located relative to the vehicle. Japanese Laid-Open Patent Publication Nos. 2006-062516 and 2012-126341 each describe an example of a tire pressure monitoring system implementing a function for automatically determining the position of each tire (automatic tire location function) when the tire positions are changed, such as when rotating the tires, or when exchanging a tire with a new one. The tire pressure monitoring system includes an initiator attached to each wheel well. The initiator transmits a radio wave signal, through wireless communication, to the corresponding tire pressure detector so that a radio wave signal is returned in response. Based on the radio wave signal from each tire pressure detector, the tire pressure monitoring system determines the position of each tire.

SUMMARY

However, to implement the automatic tire location function, an initiator needs to be arranged in each wheel well. Thus, the automatic tire location function increases the number of components and raises costs.

It is an object of the present invention to provide a tire position determination system that does not use an initiator arranged in a wheel well and is subtly affected by temperature changes or the centrifugal force produced when a tire rotates.

One aspect of the present disclosure is a tire position determination system including tire pressure detectors respectively attached to tires. A receiver is coupled to a vehicle body. The receiver is configured to receive a tire pressure signal from each tire pressure detector and monitor the pressure of the corresponding tire based on the tire pressure signal. Each tire pressure detector includes a unique detector ID. A gravity component detection unit detects a certain directional component of gravity and generates a detection signal. A transmission control unit transmits a radio wave signal including the detector ID based on the detection signal of the gravity component detection unit. The receiver includes an interface that communicates with axle rotation amount sensors. Each axle rotation amount sensor detects an axle rotation amount of a corresponding axle. A tire mounting position determination processing unit acquires the detector ID whenever receiving the radio wave signal from each tire pressure detector and the axle rotation amount detected by each axle rotation amount sensor, associates the detector IDs with the axle rotation amounts, and determines mounting positions of the tires based on the axle rotation amounts associated with the detector IDs of the tire pressure detectors.

An aspect of the present disclosure is a tire pressure monitoring system including tire pressure detectors respectively attached to tires, a receiver coupled to a vehicle body, and a display unit. Each tire pressure detector transmits a tire pressure signal, which is in accordance with the pressure of the corresponding tire, and a radio wave signal, which differs from the tire pressure signal. The receiver is configured to receive a tire pressure signal from each tire pressure detector and monitor the pressure of the corresponding tire based on the tire pressure signal. Each tire pressure detector includes a unique detector ID, an acceleration sensor that outputs a detection signal indicative of a centripetal component of gravity, which varies as the corresponding tire rotates, and a transmission control unit that transmits the radio wave signal including the detector ID based at a controlled timing or a timing when the detection signal of the acceleration sensor indicates that the tire pressure detector is located at a certain rotation position. The receiver includes an interface that communicates with axle rotation amount sensors, wherein each axle rotation amount sensor detects an axle rotation amount of a corresponding axle, and a tire mounting position determination processing unit that acquires the detector ID whenever receiving the radio wave signal from each tire pressure detector and the axle rotation amount detected by each axle rotation amount sensor, associates the detector IDs with the axle rotation amounts, and determines mounting positions of the tires based on the axle rotation amounts associated with the detector IDs of the tire pressure detectors. The receiver is configured to show a warning on the display unit indicating a pressure decrease in at least one tire in accordance with a determination result of the tire mounting position determination processing unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a schematic diagram illustrating a detector rotation angle θa;

FIG. 14 is a schematic diagram illustrating a specific example of the determination of tire positions in the second embodiment;

FIG. 19 is a schematic diagram illustrating a specific example of the determination of tire positions in the third embodiment;

FIG. 20 is a schematic diagram illustrating errors in the angle detected by the tire pressure detector at determination timings t1 and t2;

DESCRIPTION OF EMBODIMENTS

A first embodiment of a tire position determination system will now be described.

Figure 1:
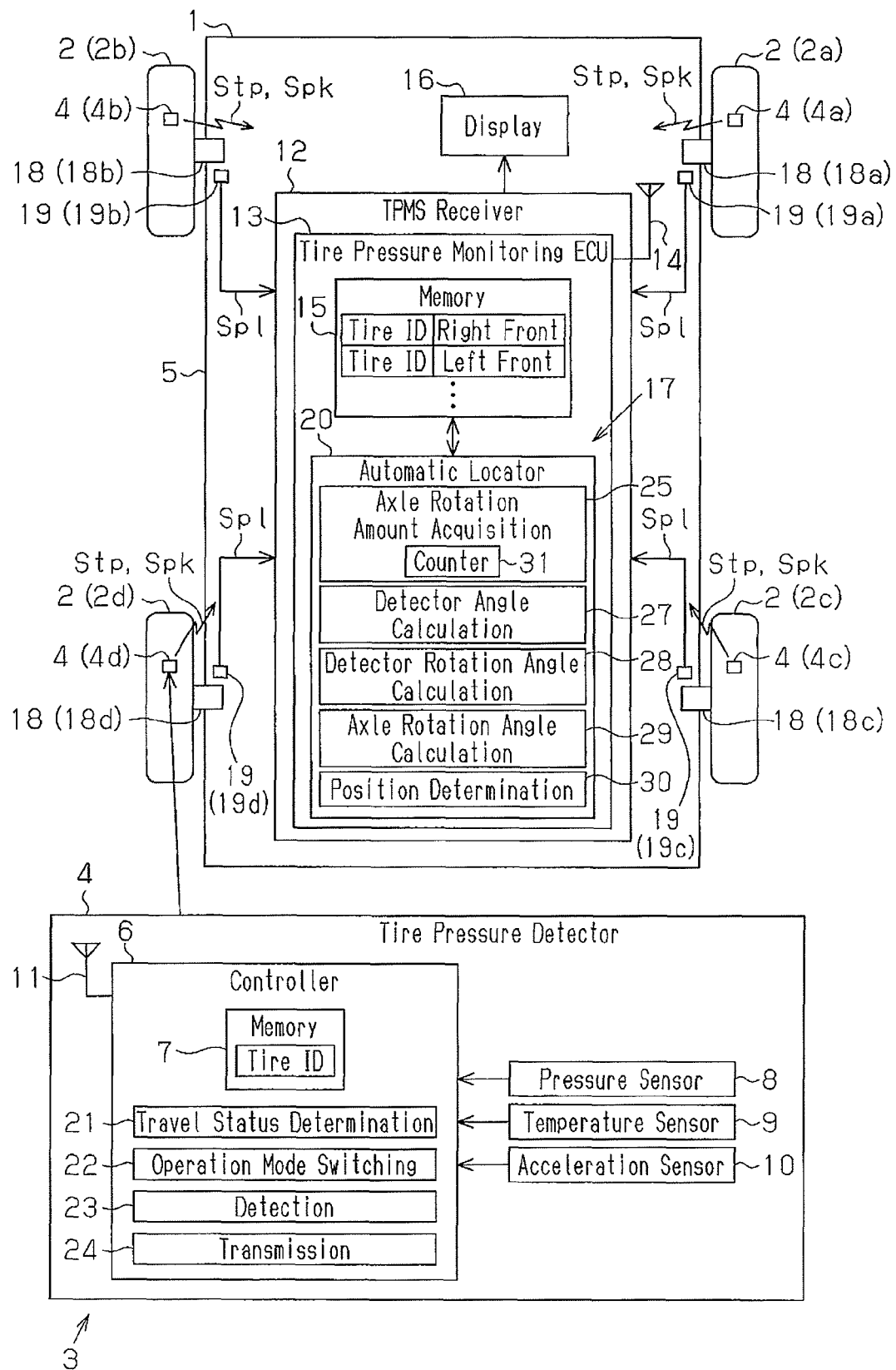
FIG. 1 is a schematic diagram showing a first embodiment of a tire position determination system.

As shown in FIG. 1, the vehicle 1 includes a tire pressure monitoring system (TPMS) 3 that monitors the pressure and the like of tires 2. The tire pressure monitoring system 3 includes tire pressure detectors 4a to 4d (also referred to as the transmitters) respectively arranged on tires 2a to 2d. Each of the tire pressure detectors 4a to 4d transmits, through wireless communication, a tire pressure signal Stp, which corresponds to the detected tire pressure, to a vehicle body 5.

Each of the tire pressure detectors 4a to 4d includes a pressure sensor 8, which detects the tire pressure, an acceleration sensor 10, and a controller 6 (also referred to as the transmitter controller). Each transmitter controller 6 includes a memory 7 that stores a unique ID (also referred to as the tire ID code or the detector ID code). In the illustrated example, each of the tire pressure detectors 4a to 4d includes a temperature sensor 9 that detects the tire temperature. A transmission antenna 11, which allows for the transmission of a radio wave signal on the ultrahigh frequency (UHF) band, is connected to the transmitter controller 6. The acceleration sensor 10 is one example of a gravity component detection unit.

A receiver 12 (also referred to as the TPMS receiver) receives tire pressure signals Stp from the tire pressure detectors 4a to 4d. The receiver 12 includes a tire pressure monitoring electronic control unit (ECU) 13 and a reception antenna 14, which receives a UHF radio wave signal. The tire pressure monitoring ECU 13 includes a memory 15 that stores tire ID codes of the tires 2a to 2d in association with the tire positions (right front, left front, right rear, and left rear). A display unit 16, which is arranged, for example, in the vehicle 1 on an instrument panel, is connected to the receiver 12.

Figure 3:
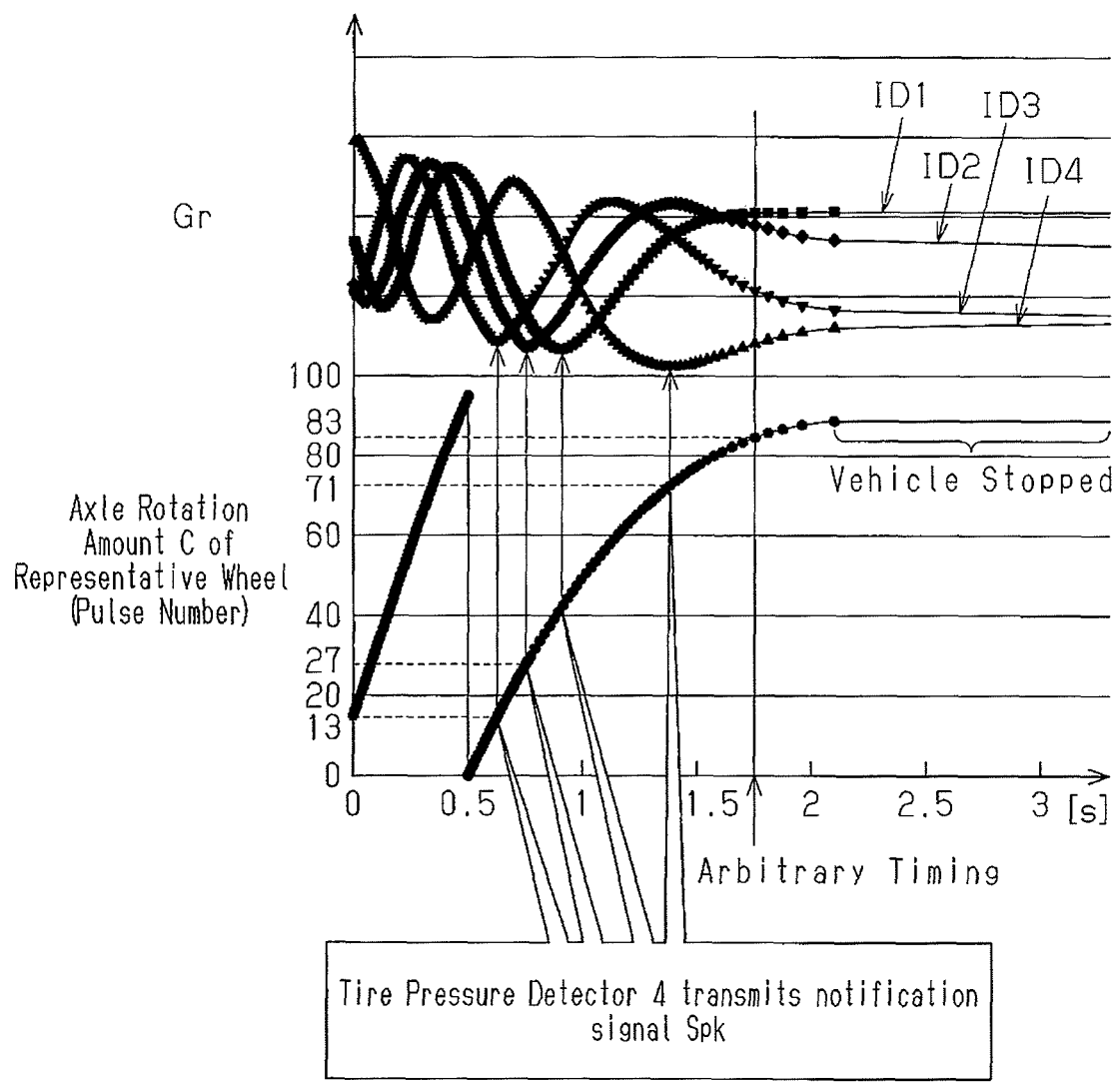
FIG. 3 is a timing chart illustrating the count value of a pulse signal indicative of an axle rotation amount for a representative wheel and the detection signal of an acceleration sensor.

Each transmitter controller 6 transmits a tire pressure signal Stp to the vehicle body in predetermined fixed intervals or in variably controlled intervals when the corresponding tire 2 is rotating and/or stopped. The transmitter controller 6 may detect that the tire 2 has started to rotate based on, for example, a detection signal from the acceleration sensor 10. In the example of FIG. 3, when the tire 2 is rotating, the detection signal of the acceleration sensor 10 indicates repetitive variations in the acceleration (gravity) acting on the tire pressure detector 4. In contrast, when the tire 2 is stopped, the detection signal of the acceleration sensor 10 substantially does not change. Preferably, the transmission interval of the tire pressure signal Stp when the tire 2 is stopped is longer than the transmission interval of the tire pressure signal Stp when the tire 2 is rotating. However, the intervals may be the same.

The receiver 12 receives a tire pressure signal Stp from each of the tire pressure detectors 4a to 4d with the reception antenna 14 and verifies the tire ID code that is included in the tire pressure signal Stp. When the tire ID code is verified, the receiver 12 checks the tire pressure that is included in the tire pressure signal Stp. When the tire pressure is less than or equal to a lower limit value, the receiver 12 indicates the position of the low-pressure tire on the display unit 16. In one example, the receiver 12 determines the tire pressure whenever receiving the tire pressure signal Stp.

The tire pressure monitoring system 3 includes a tire position determination system 17 that determines the mounting positions of the tires 2a to 2d on the vehicle body 5 (right front, left front, right rear, left rear, and the like). The tire pressure monitoring ECU 13 includes an automatic locator 20 that determines the mounting positions of the tires 2a to 2d that are respectively mounted on axles 18 (18a to 18d). Axle rotation amount sensors 19 (19a to 19d) are respectively attached to the axles 18. The automatic locator 20 determines the mounting positions of the tires 2a to 2d using axle rotation amount information of the axles 18a to 18d generated by the axle rotation amount sensors 19a to 19d and gravitational information generated by the acceleration sensors 10 of the tire pressure detectors 4a to 4d. In one example, the automatic locator 20 repeats a routine for determining the position of the tires 2a to 2d in predetermined fixed intervals.

The receiver 12 includes an interface used for communication with the axle rotation amount sensors 19a to 19d, which may be sensors for an antilock brake system (ABS). In the illustrated example, each of the axle rotation amount sensors 19a to 19d provides the receiver 12 with rectangular pulses Spl whenever detecting one of the teeth arranged on the corresponding one of the axles 18a to 18d. For example, when there are 48 teeth, a pulse Spl is output when each of the axle rotation amount sensors 19a to 19d detects a tooth or a gap between adjacent teeth. Thus, 96 pulses Spl are output for each tire rotation.

Figure 2:
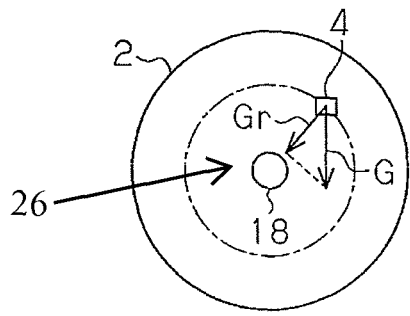
FIG. 2 is a schematic diagram illustrating the centripetal component of gravity detected by a tire pressure detector.

Each acceleration sensor 10 is configured to output a detection signal indicative of a certain directional component of gravity varying with a rotation of the corresponding tire 2, such as a centripetal component of gravity Gr as illustrated in FIG. 2. In one example, when the tire pressure detector 4 is located on a tire 2 at a twelve o'clock position (i.e., uppermost position) or a six o'clock position (i.e., lowermost position), as long as centrifugal force is not considered, the centripetal component of gravity Gr is "−1 G" or "+1 G." When the tire pressure detector 4 is located on a tire 2 at a three o'clock position or a nine o'clock position, the centripetal component of gravity Gr is "0 G."

In the example illustrated in FIG. 1, each transmitter controller 6 includes a travel status determination unit 21 and an operation mode switching unit 22. The travel status determination unit 21 determines the travel status of the vehicle 1 based on the detection signal of the acceleration sensor 10, in particular, the centripetal component of gravity Gr. The operation mode switching unit 22 switches the operation mode of the corresponding one of the tire pressure detectors 4a to 4d. The travel status determination unit 21 calculates the vehicle velocity V based on variations (varied amount and/or varied time) of the centripetal component of gravity Gr. When the vehicle velocity V is greater than or equal to a first threshold V1, which corresponds to a relatively high velocity, the operation mode switching unit 22 switches the operation mode of the corresponding one of the tire pressure detectors 4a to 4d to a pressure determination mode. When the vehicle velocity V is between the first threshold V1 and a second threshold V2, which corresponds to a relatively low velocity such as when the vehicle is about to stop, the operation mode switching unit 22 switches the operation mode of the corresponding one of the tire pressure detectors 4a to 4d to an automatic location preparation mode. When the vehicle velocity V is less than the second threshold V2, the operation mode switching unit 22 switches the operation mode of the corresponding one of the tire pressure detectors 4a to 4d to an automatic location mode. After a predetermined determination time elapses from when the operation mode is switched to the automatic location mode, the operation mode switching unit 22 forcibly returns the operation mode of the corresponding one of the tire pressure detectors 4a to 4d to the pressure determination mode. The predetermined determination time provides sufficient time for completing the automatic location.

Each transmitter controller 6 includes a characteristic point detection unit 23 and a notification signal transmission unit 24. The characteristic point detection unit 23 detects characteristic points in the detection signal of the corresponding acceleration sensor 10, such as an extreme point or a turning point. When the characteristic point detection unit 23 detects a characteristic point, the notification signal transmission unit 24 transmits a notification signal Spk to the receiver 12. In the illustrated example, the characteristic point detection unit 23 detects the minimum point in the detection signal of the acceleration sensor 10 that corresponds to the twelve o'clock position of the corresponding one of the tire pressure detectors 4a to 4d. In one example, the notification signal Spk includes a tire ID code and a command that notifies that the centripetal component of gravity Gr is indicative of a peak or valley. The characteristic point detection unit 23 and the notification signal transmission unit 24 form one example of a transmission control unit. The notification signal Spk is one example of a radio wave signal for notification of at least the tire ID code. The characteristic point detection unit 23 is also referred to a specific rotation position detection unit that detects that the tire pressure detector 4 is located at a specific rotation position of the tire 2 such as the uppermost position or the lowermost position.

The automatic locator 20 includes an axle rotation amount acquisition unit 25 that acquires the number of pulses Spl output from the axle rotation amount sensors 19a to 19d, that is, the axle rotation amount C of each of the axles 18a to 18d. The axle rotation amount acquisition unit 25 includes a counter 31 that counts the rising and falling edges of the pulses Spl of the axle rotation amount sensors 19a to 19d. In the illustrated example, the count value of the counter 31 is continuously varied between 0 and 95 during a single wheel rotation.

Figure 4:
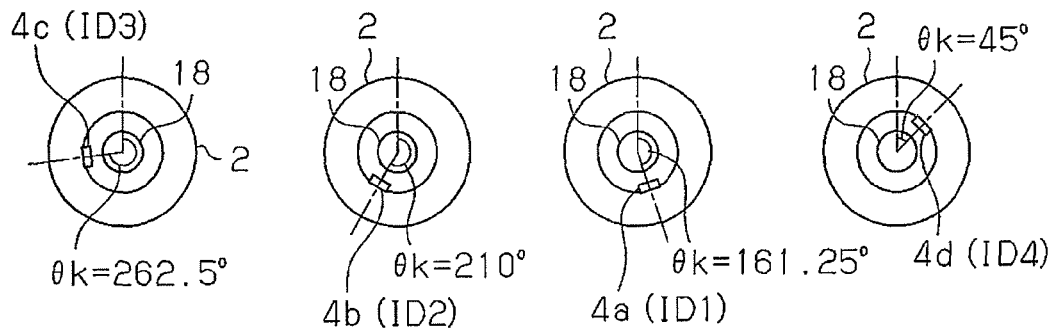
FIG. 4 is a schematic diagram illustrating a detector angle θk of a tire pressure detector arranged in each tire.
Figure 5:
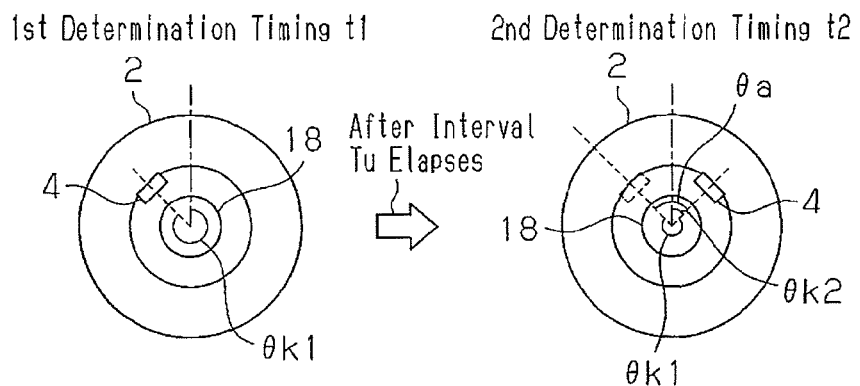

The automatic locator 20 includes a detector angle calculation unit 27. Whenever a notification signal Spk is received from each of the tire pressure detectors 4a to 4d, the detector angle calculation unit 27 stores an axle rotation amount Cn (e.g., n=1 to 4) of the wheel 26 corresponding to the tire pressure detector 4a, 4b, 4c or 4d in association with the tire ID code in the signal Spk. After acquiring the axle rotation amounts Cn (e.g., C1 to C4) of every one of the tires 2, the detector angle calculation unit 27 calculates the detector angle θk of each of the tire pressure detectors 4a to 4d based on the axle rotation amount Cn corresponding to each tire 2 and the present axle rotation amount Cref of the corresponding wheel 26. As shown in FIG. 4, for example, when viewing the vehicle body 5 from one side, the angle θk is the angle between the twelve o'clock position (reference point) of each tire 2 and the corresponding one of the tire pressure detectors 4a to 4d. As shown in FIG. 5, the angle θk is calculated at a first determination timing t1 and a second determination timing t2 with an interval Tu in between.

The automatic locator 20 includes a detector rotation angle calculation unit 28 that calculates the rotation angle ea of each of the tire pressure detectors 4a to 4d during a period from the first determination timing t1 to the second determination timing t2 based on the detector angle θk1 calculated at the first determination timing t1 and the detector angle θk2 calculated at the second determination timing.

The representative wheel 26 is preferably selected from a non-steered wheel (right rear wheel or left rear wheel). This is because the rotation amount difference between the left and right non-steered wheels is smaller than that between the left and right steered wheels. The detector angle calculation unit 27 and the detector rotation angle calculation unit 28 function as a position determination processing unit.

FIG. 3 illustrates variations in the detection signals of the acceleration sensors 10 and variations in the count value of the axle rotation amount acquisition unit 25 (counter 31). In the illustrated example, when the detection signal of the acceleration sensor 10 in a tire 2 is at a minimum point (valley), that is, when a transmitter 4 of the tire 2 is located at the twelve o'clock position, a notification signal Spk including the tire ID code of the transmitter 4 is transmitted. The detector angle calculation unit 27 acquires the axle rotation amount Cn (n=1 to 4) of the representative wheel 26 when the notification signal Spk is received. For example, when the received notification signal Spk includes tire ID code ID3, that is, when the right rear tire pressure detector 4c is located at the twelve o'clock position, the detector angle calculation unit 27 acquires, in association with tire ID code ID3, 13 as the axle rotation amount C3 of the representative wheel 26. In the same manner, when the received notification signal Spk includes tire ID code ID2, that is, when the left front tire pressure detector 4b is located at the twelve o'clock position, the detector angle calculation unit 27 acquires, in association with tire ID code ID2, 27 as the axle rotation amount C2 of the representative wheel 26. When the received notification signal Spk includes tire ID code ID1, that is, when the right front tire pressure detector 4a is located at the twelve o'clock position, the detector angle calculation unit 27 acquires, in association with tire ID code ID1, 40 as the axle rotation amount C1 of the representative wheel 26. When the received notification signal Spk includes tire ID code ID4, that is, when the left rear tire pressure detector 4d is located at the twelve o'clock position, the detector angle calculation unit 27 acquires, in association with tire ID code ID4, 71 as the axle rotation amount C4 of the representative wheel 26. In the description hereafter, the tire ID code refers to a notification signal Spk including the tire ID code or a detection signal of the acceleration sensor 10 in a tire pressure detector 4 including a tire ID code.

After the axle rotation amounts C1 to C4 of the representative wheel 26 is acquired for every one of the tire pressure detectors 4a to 4d, at an arbitrary determination timing, for example, when the axle rotation amount Cref of the representative wheel 26 becomes "83," the detector angle calculator 27 calculates the angle θk of each of the tire pressure detectors 4a to 4d. In one example, the arbitrary determination timing is when a predetermined time elapses from when the axle rotation amounts C1 to C4 corresponding to the tire pressure detectors 4a to 4d are all acquired. In another example, the arbitrary timing is the moment the final axle rotation amount Cn is acquired. The notification signal Spk is transmitted from each of the notification signals Spk in substantially fixed intervals.

Referring to FIG. 4, the angle θk is the angle of each of the tire pressure detectors 4a to 4d from a reference position (e.g., twelve o-clock position). In the example of FIG. 4, when the count value of the pulses Spl is "83" for the representative wheel 26, tire ID code ID3 indicates that the angle θk of the right rear tire pressure detector 4c is 262.5 degrees ((83−13)× 360/96). In the same manner, tire ID code ID2 indicates that the angle θk of the left front tire pressure detector 4b is 210 degrees ((83−27)×360/96). Tire ID code ID1 indicates that the angle θk of the right front tire pressure detector 4a is 161.25 degrees ((83−40)×360/96). Tire ID code ID4 indicates that the angle θk of the left rear tire pressure detector 4d is 45 degrees ((83−71)×360/96).

Referring to FIG. 5, the detector rotation angle calculation unit 28 calculates the detector rotation angle θa, which is the difference between angle θk1 at the first determination timing t1 and angle θk2 at the second determination timing t2 for each of the tire pressure detectors 4a to 4d.

Referring to FIG. 1, the automatic locator 20 includes an axle rotation angle calculation unit 29 that calculates the axle rotation angle θb from the axle rotation amount C counted during the intervals Tu. The axle rotation angle calculation unit 29 calculates the axle rotation angle θb for each of the axles 18a to 18d. The axle rotation angle calculation unit 29 functions as a position determination processing unit and a tire position determination unit.

Figure 6:
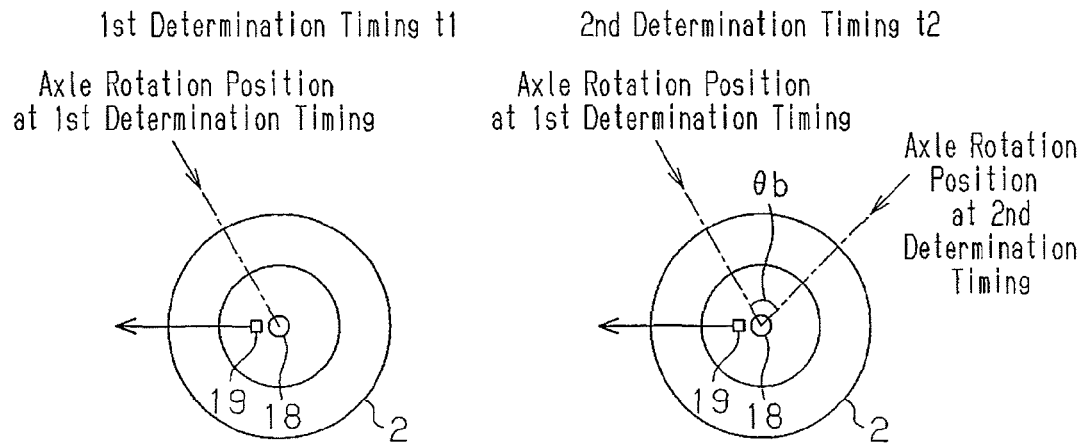
FIG. 6 is a schematic diagram illustrating an axle rotation angle θb.

Referring to FIG. 6, the axle rotation angle θb is the rotation angle of the axle 18 taken between the first determination timing t1 and the second determination timing t2. However, under a situation in which a rotation amount difference is produced between an inner wheel and an outer wheel such as when travelling along a curved road, it is preferable that the tire mounting positions be determined based on the rotation of the axles 18 and the rotation positions of the tires 2. This is because under a situation in which a rotation difference is produced between the inner and outer wheels, the rotation of the axles 18 results in different rotation amounts or different rotation angles. For example, when the vehicle 1 is travelling along a curved road, the axles 18a to 18d have different rotation amounts. Thus, the count values of the pulses Spl differ between the axle rotation amount sensors 19a to 19b in accordance with the tire mounting position. Accordingly, the axle rotation angle θb is calculated with high accuracy for each of the axles 18a to 18d. The same applies to the rotation of the tires 2.

As shown in FIG. 1, the automatic locator 20 includes a tire mounting position determination unit 30 that determines tire mounting positions based on the detector rotation angle θa and the axle rotation angle θb. For example, the tire mounting position determination unit 30 checks which one of the detector rotation angle θa conforms to which one of the axle rotation angles θb to determine the mounting positions of the tires 2a to 2d. The tire mounting position determination unit 30 functions as a position determination processing unit.

The operation of the tire pressure detectors 4a to 4d will now be described with reference to FIGS. 3 and 7 to 11.

Figure 7:
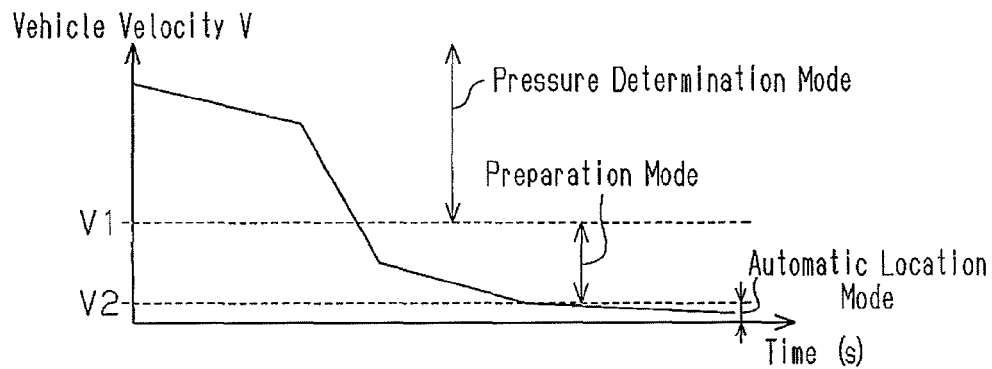
FIG. 7 is a graph illustrating the vehicle velocity and an operation mode of the tire pressure detector.

Referring to FIG. 7, each tire pressure detector 4 switches modes in accordance with the vehicle velocity V. When the vehicle velocity V is greater than or equal to the first threshold V1, the tire pressure detectors 4a to 4d operates in a pressure determination mode. During the pressure determination mode, the transmission interval of a radio wave signal is set to, for example, one minute. When the vehicle is stopped or parked, the transmission interval of a radio wave signal is set to, for example, five minutes. During the pressure determination mode, pressure measurement and temperature measurement are performed in fixed intervals whenever a radio wave signal is transmitted. Further, in the pressure determination mode, the measurement interval of the acceleration sensor 10 is set to, for example, ten seconds to determine whether the vehicle is travelling or stopped.

When the vehicle velocity V is between the first threshold V1 and the second threshold V2, the operation mode switching unit 22 switches the corresponding one of the tire pressure detectors 4a to 4d to the automatic location preparation mode. When the tire pressure detectors 4a to 4d are in the automatic location preparation mode, the measurement interval of the acceleration sensor 10 is shortened to, for example, twenty milliseconds to accurately determine whether the vehicle 1 is stopping. During the automatic location preparation mode, the monitoring of the tire pressure (i.e., pressure measurement, temperature measurement, and transmission of measurements) is performed in the same manner as the pressure determination mode.

When the vehicle velocity V is less than the second threshold V2, the operation mode switching unit 22 switches the corresponding one of the tire pressure detectors 4a to 4d to the automatic location mode. During the automatic location mode, the transmission interval of radio wave signals is set to, for example, thirty seconds. During the automatic location mode, the measurement interval of the acceleration sensor 10 is set to twenty milliseconds, which is the same as the automatic location preparation mode. In the automatic location mode, pressure measurement and temperature measurement are not performed. When a predetermined duration time (e.g., three minutes) elapses, the operation mode switching unit 22 returns the automatic location mode to the pressure determination mode.

In another example, when radio wave signals are transmitted in fixed intervals for a predetermined number of times (e.g., ten times) during the automatic location mode, the operation mode switching unit 22 forcibly returns the operation mode to the pressure determination mode. In a further example, after the vehicle velocity V becomes greater than or equal to the first threshold V1, if the vehicle velocity V falls again and becomes less than the second value V2, the operation mode switching unit 22 switches the operation mode to the automatic location mode.

Referring to FIG. 3, when the vehicle velocity V is relatively high at around 0 to 1 s, the waveform of the detection signal from each acceleration sensor 10 is plotted diagonally downward to the right. This is because the detection signal of the acceleration sensor 10 reflects the centripetal component of gravity Gr and the centrifugal force, which is produced by the high-speed rotation of the corresponding tire 2 and relatively large. Thus, to reduce the influence of the centrifugal force, it is preferable that the operation mode be shifted to the automatic location mode after the vehicle velocity V becomes low.

The tire pressure detectors 4a to 4d are configured to separately transmit radio wave signals (notification signals Spk). The length of time (frame time) used to transmit a notification signal Spk is extremely short. However, when the tires 2a to 2d are rotating at a high speed, notification signals Spk may interfere with one another. For example, when a tire 2 completes a single rotation in thirty milliseconds and each of the tire pressure detectors 4a to 4d transmit a notification signal Spk within a frame time of eight milliseconds, the notification signals Spk may interfere with one another. Thus, when the tires 2a to 2d are rotated at a low speed, the notification signals Spk are less likely to interfere with one another. Consequently, the automatic location mode performed at a low speed is advantageous since interference may be reduced.

Figure 8:
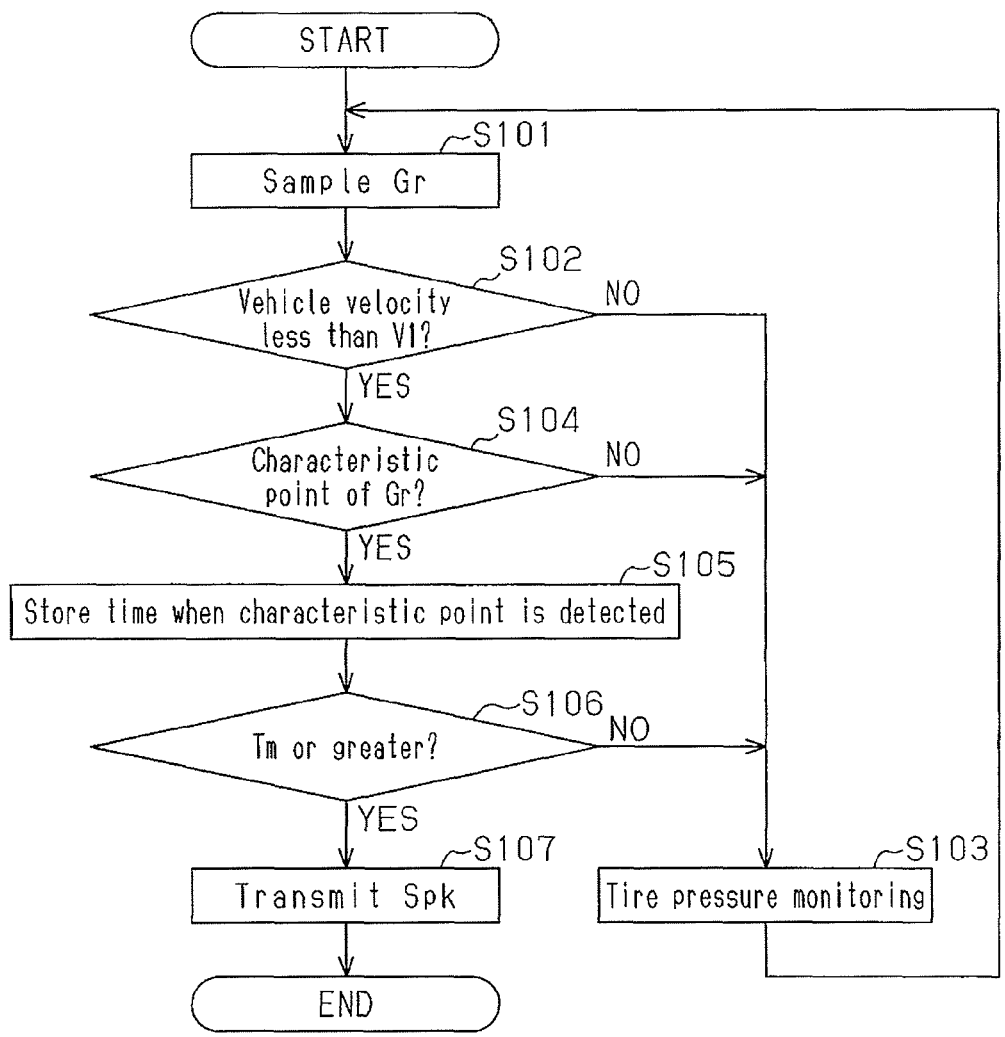
FIG. 8 is a flowchart illustrating the operation of a tire pressure detector.

FIG. 8 is a flowchart illustrating the operation of each of the tire pressure detectors 4a to 4d.

In step S101, each of the tire pressure detectors 4a to 4d samples the detection signals of the corresponding acceleration sensor 10 and temporarily stores the detection result in the memory 7. The travel status determination unit 21 determines the travel status of the vehicle 1, such as the vehicle velocity, based on the sampled detection signals of the acceleration sensor 10.

In step S102, each of the tire pressure detectors 4a to 4d determines whether or not the vehicle velocity V is less than the first threshold V1 based on the detection signal of the acceleration sensor 10. In one example, the travel status determination unit 21 determines whether or not the vehicle velocity V is less than the first threshold V1 based on variations in the detection signals of the acceleration sensor 10 per unit time. When the vehicle velocity V is less than the first threshold value V1, the tire pressure detectors 4a to 4d proceed to step S104. Otherwise, the tire pressure detectors 4a to 4d proceed to step S103.

In step S103, the tire pressure detectors 4a to 4d perform a normal tire pressure detection process. The tire pressure detectors 4a to 4d operate in the pressure determination mode, measure the pressure and temperature when radio wave signals are transmitted in fixed intervals, and transmit tire pressure signals Stp including the measurement results to the receiver 12.

In step S104, the characteristic point detection unit 23 determines whether or not the detection signal of the acceleration sensor 10 is indicative of a characteristic point (e.g., minimum point). In the illustrated example, the characteristic point is the minimum point in a detection signal of the acceleration sensor 10 corresponding to the twelve o'clock position of the tire pressure detectors 4a to 4d. When the detection signal of the acceleration sensor 10 is indicative of a characteristic point, the processing proceeds to step S105. Otherwise, the processing proceeds to step S103.

In step S105, the notification signal transmission unit 24 records the time at which a characteristic point was detected in the detection signal of the acceleration sensor 10.

Figure 9:
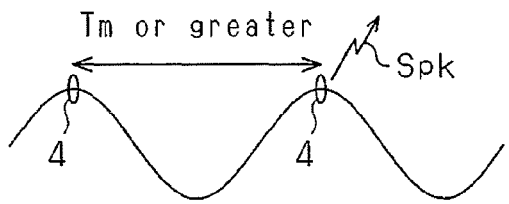
FIG. 9 is a schematic diagram illustrating the transmission timing of a notification signal Spk from the tire pressure detector.

FIG. 9 shows the transmission timing of radio wave signals (notification signals Spk) when the vehicle velocity V is sufficiently low. As described above, if the radio wave signals (notification signals Spk) are transmitted when the vehicle velocity V is high, interference occurs between the notification signals Spk. In this case, the notification signals Spk are repetitively transmitted until correctly transferred to the receiver 12. This may result in excessive power consumption in the tire pressure detectors 4a to 4d. Thus, the tire pressure detectors 4a to 4d transmit the notification signals Spk when the vehicle speed V is sufficiently low and the time interval between two consecutive characteristic points is greater than or equal to a predetermined time Tm. This obviates or reduces unnecessary transmissions of the notification signals Spk and interference between the notification signals Spk.

In step S106, which is illustrated in FIG. 8, the notification signal transmission unit 24 checks whether the time between the detection of the present characteristic point and the detection of the previous characteristic point is longer than or equal to a predetermined time Tm. When longer than or equal to the predetermined time, the processing proceeds to step S107. Otherwise, the processing proceeds to step S103. In another example, a predetermined time range Tm±ΔT is used in lieu of the predetermined time Tm.

In step S107, the notification signal transmission unit 24 transmits, through wireless communication, the notification signal Spk to the receiver 12.

The operation of the receiver 12 will now be described.

Figure 10:
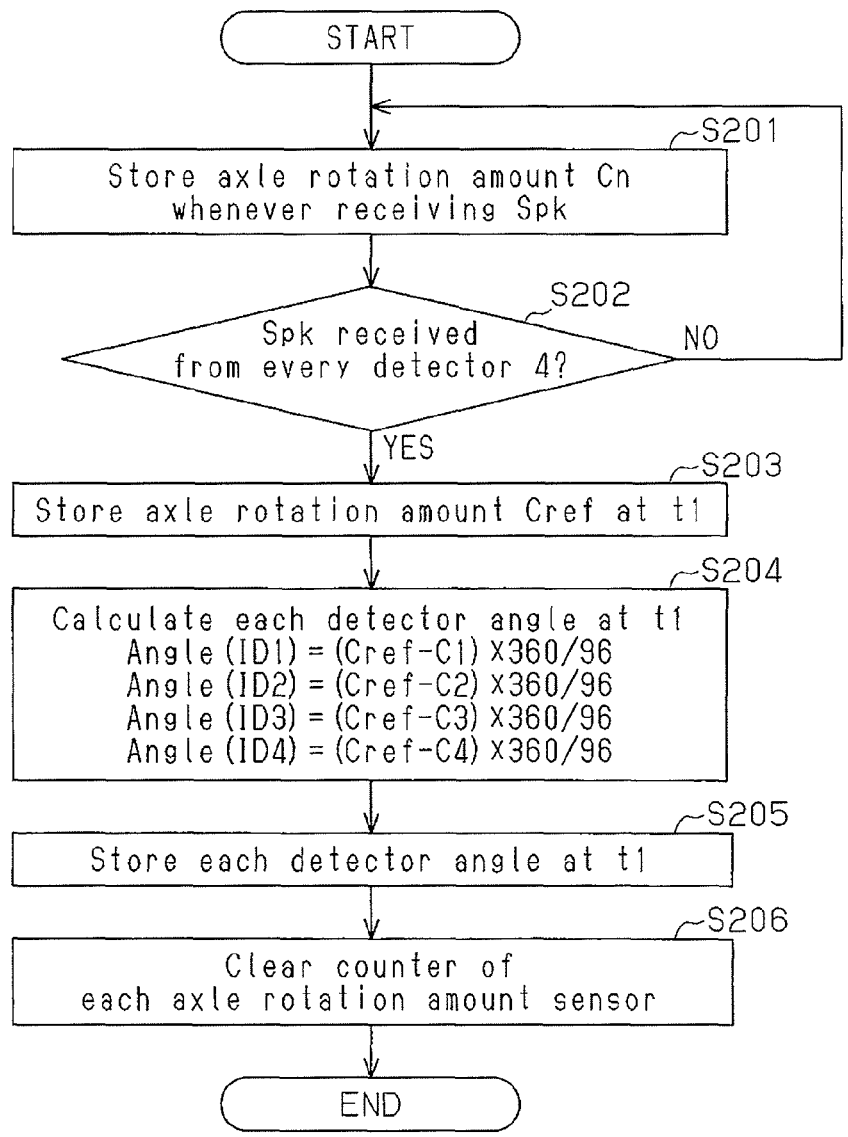
FIG. 10 is a flowchart illustrating a tire position determination routine executed by a receiver.

In step S201, which is illustrated in FIG. 10, the receiver 12 receives notification signals Spk from the tire pressure detectors 4a to 4d. The detector angle calculation unit 27 stores the axle rotation amount Cn (n=1 to 4) of the representative wheel 26 when receiving the notification signals Spk in association with the tire ID codes. The detector angle calculation unit 27 repeats step S201 until receiving the notification signal Spk from every one of the tire pressure detectors 4a to 4d.

In step S202, the detector angle calculation unit 27 determines whether or not the notification signal Spk has been received from every one of the tire pressure detectors 4a to 4d. When the notification signal Spk has been received from every one of the tire pressure detectors 4a to 4d, the detector angle calculation unit 27 proceeds to step S203. Otherwise, the detector angle calculation unit 27 returns to step S201.

In step S203, after receiving the notification signal Spk from every one of the tire pressure detectors 4a to 4d, the detector angle calculation unit 27 acquires the axle rotation amount Cref of the representative wheel 26 and stores the axle rotation amount Cref in the memory 15.

In step S204, the detector angle calculation unit 27 calculates the angle $\theta k1$ of each of the tire pressure detectors 4a to 4d at the first determination timing t1. In the illustrated example, the detector angle $\theta k1$ corresponding to tire ID code ID1 is calculated from (Cref−C1)×360/96. The detector angle $\theta k1$ corresponding to tire ID code ID2 is calculated from (Cref−C2)×360/96. The detector angle $\theta k1$ corresponding to tire ID code ID3 is calculated from (Cref−C3)×360/96. The detector angle $\theta k1$ corresponding to tire ID code ID4 is calculated from (Cref−C4)×360/96.

In step S205, the detector angle calculation unit 27 stores in the memory 15 the detector angles $\theta k1$ corresponding to tire ID codes ID1 to ID4 at the first determination timing.

In step S206, the axle rotation amount acquisition unit 25 clears the counter 31. Accordingly, the counter 31 of the axle rotation amount acquisition unit 25 counts the pulses Spl output from the axle rotation amount sensors 19a to 19d as the vehicle travels after the detection angle $\theta k1$ is calculated for the four wheels at the first determination timing t1.

When the vehicle velocity V is relatively low after the first determination timing t1, the receiver 12 receives notification signals Spk from the tire pressure detectors 4a to 4d. Through procedures similar to steps S201 to S205, the receiver 12 calculates the detector angle $\theta k2$ of each of the tire pressure detectors 4a to 4d at the second determination timing t2 after receiving the notification signals Spk from every one of the tire pressure detectors 4a to 4d.

The interval Tu between the first determination timing t1 and the second determination timing t2 may be fixed or variable. A variable interval Tu, for example, may vary in accordance with the transmission timing of the tire pressure detector 4. However, in this case, it is preferable that the interval Tu not be a short time of merely a few seconds.

The interval Tu may be the time until the tire pressure detector 4 switches to the automatic location mode. In this case, the switching to the automatic location mode is performed when the vehicle velocity V decreases. This increases the possibility of a rotation amount difference being produced between the inner and outer wheels after the mode is switched.

Even when each tire pressure detector 4 is configured to transmit radio wave signals in fixed intervals, it is preferable that the tire pressure detectors 4 transmit the radio waves within a relatively short period. For example, when a tire pressure detector 4 transmits a notification signal Spk, before that tire pressure detector 4 finishes a single rotation, it is preferable that the remaining three tire pressure detectors 4 each complete the transmission of the notification signal Spk.

Figure 11:
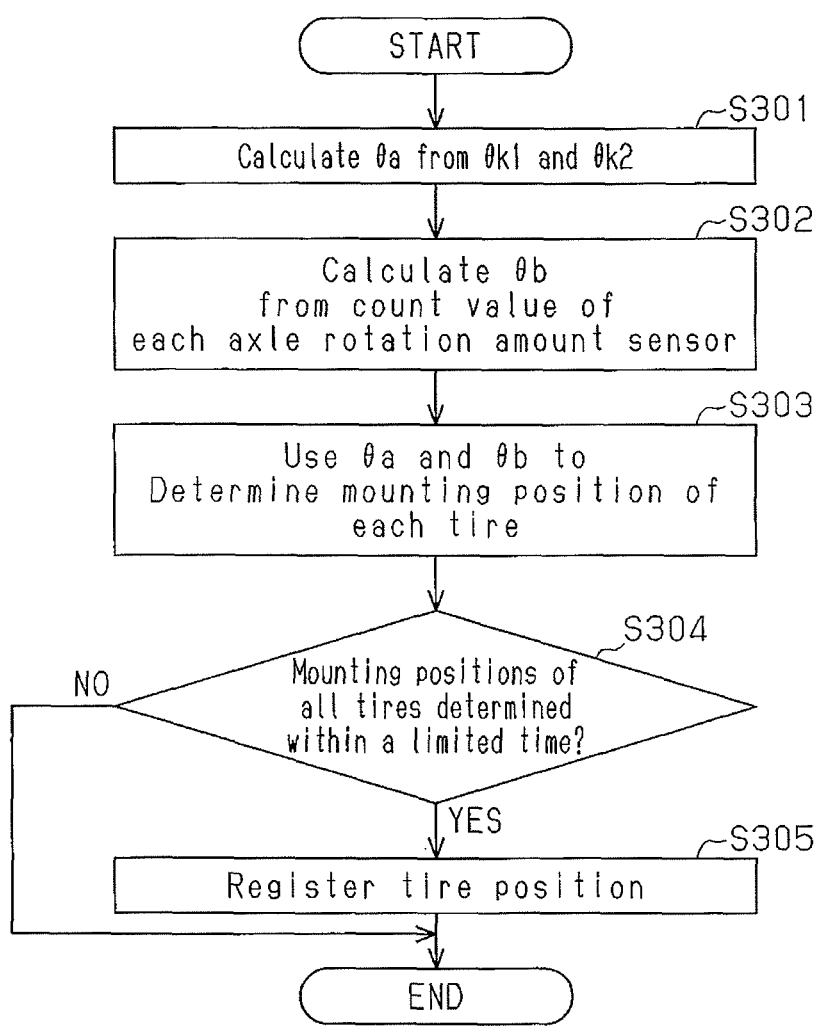
FIG. 11 is a flowchart illustrating another tire position determination routine executed by the receiver.

In step S301, which is illustrated in FIG. 11, the detector rotation angle calculation unit 28 calculates the detector rotation angle $\theta a$ during the interval Tu based on the detector angle $\theta k1$ at the first determination timing t1 and the detector angle $\delta k2$ at the second determination timing t2.

In step S302, the axle rotation angle calculation unit 29 divides the count value of the counter 31, which is the number of pulses Spl from each of the axle rotation amount sensors 19a to 19d, with the total number of pulses for each tire rotation (in the illustrated example, 96) to obtain a quotient and a remainder. The axle rotation angle calculation unit 29 determines the axle rotation angle $\theta b$ from the remainder.

In step S303, the position determination unit 30 uses the detector rotation angle $\theta a$ obtained in step S301 and the axle rotation angle $\theta b$ obtained in step S302 to determine the mounting position of each of the tires 2a to 2d. For example, the position determination unit 30 checks which one of the detector rotation angles $\theta a$ conforms to which one of the axle rotation angles $\theta b$ to determine the tire ID code (detector ID code) and the axle (tire mounting position). When the detector rotation angles $\theta a$ all have conforming axle rotation angles $\theta b$, the mounting positions are determined for all of the tires 2.

In step S304, the position determination unit 30 determines whether or not the mounting positions of every one of the tires 2a to 2d have been determined within a predetermined limited time. When the mounting positions of every one of the tires 2a to 2d cannot be determined within the limited time, the processing is forcibly terminated and the routine of FIG. 11 is performed again in another opportunity.

When the mounting positions of every one of the tires 2a to 2d have been determined within the limited time (YES in step S304), in step S305, the position determination unit 30 registers the tire mounting positions to the memory 15 of the tire pressure monitoring ECU 13. For example, the position determination unit 30 stores which one of the tire ID codes (detector ID codes) belongs to which one of the tires 2a to 2d. This completes the automatic location of the tires 2a to 2d. The automatic location is repetitively performed in predetermined cycles.

The first embodiment has the advantages described below.

(1) Each of the tire pressure detectors 4a to 4d transmits a notification signal Spk when detecting a characteristic point (twelve o'clock position) in the detection signal of the acceleration sensor 10. Whenever receiving a notification signal Spk from the tire pressure detectors 4a to 4d, the axle rotation amount Cn of the present representative wheel 26 is stored in the memory 15 in association with the tire ID code in the notification signal Spk. When the axle rotation amount Cn is stored in association with every one of the tire pressure detectors 4a to 4d, the receiver 12 reads the axle rotation amount Cref of the representative wheel 26 at the first determination timing t1 and uses the axle rotation amount Cn (n=1 to 4) and the axle rotation amount Cref to calculate the angle $\theta k1$ of each of the tire pressure detectors 4a to 4d at the first determination timing t1. The receiver 12 performs the same process at the second determination timing t2. The receiver 12 calculates the detector rotation angle $\theta a$ of each of the tire pressure detectors 4a to 4d in the interval Tu from the detector rotation angle $\theta k1$ at the first determination timing t1 and the detector angle $\theta k2$ at the second determination timing t2. The receiver 12 calculates the axle rotation angle $\theta b$ of each of the axles 18a to 18d in the interval Tu from the number of pulses Spl (axle rotation amount C) of each of the axle rotation amount sensors 19a to 19d in the interval Tu. The receiver 12 compares the calculated detector rotation angle $\theta a$ with the axle rotation angle $\theta b$ to determine the tire mounting positions.

The angle $\theta k$ of each of the tire pressure detectors 4a to 4d may be calculated from the difference of the axle rotation number Cn of the representative wheel 26, when the acceleration sensor 10 of each of the tire pressure detectors 4a to 4d detects the characteristic point in the detection signal of the acceleration sensor 10 indicating the twelve o'clock position, and the axle rotation amount Cref of the representative wheel 26 at a determination timing after the axle rotation amount Cn of every one of the tires 2 is acquired. In this manner, the detector angle θk is obtained by detecting the characteristic point in the detection signal of the acceleration sensor 10 and not from the value of the centripetal component of gravity Gr included in the detection signal of the acceleration sensor 10. Thus, the determination results of the tire mounting positions are subtly affected by temperature changes and measurement errors in the detection signal of the acceleration sensor 10. This improves the determination accuracy of the tire mounting positions.

(2) Each of the tire pressure detectors 4a to 4d transmits, through wireless communication, the notification signal Spk when the vehicle velocity V is low and less than the second threshold V2. The receiver 12 transmits the notification signal Spk from which the influence of centrifugal force is reduced or eliminated. This improves the determination accuracy of the tire mounting positions.

(3) Each of the tire pressure detectors 4a to 4d transmits, through wireless communication, the notification signal Spk when the vehicle velocity V is low and less than the second threshold V2. Thus, the timings at which notification signals Spk are transmitted from different tire pressure detectors do not easily overlap with one another. This reduces or obviates interference between the notification signals Spk. Thus, the receiver 12 correctly transmits the notification signals Spk (establishes communication) more frequently.

(4) Each of the tire pressure detectors 4a to 4d includes the characteristic point detection unit 23 that detects a characteristic point in the detection signal of the acceleration sensor 10 indicative of a certain directional component of gravity varying with a rotation of the corresponding tire 2. This allows for the receiver 12 to accurately determine that the tire pressure detectors 4a to 4d are located at a certain position in the tire rotation direction.

(5) When the time between two consecutive minimum points detected in the detection signal of an acceleration sensor is longer than or equal to the predetermined time Tm, the tire pressure detectors 4a to 4d are each allowed to transmit a notification signal Spk. Interference between different notification signals Spk from the pressure detectors 4a to 4d is reduced or obviated. Thus, the receiver 12 correctly transmits the notification signals Spk (establishes communication) more frequently.

(6) Each of the tire pressure detectors 4a to 4d includes the operation mode switching unit 22. The operation mode switching unit 22 determines the travel status of the vehicle from variations in the detection signal of the corresponding acceleration sensor 10 that is indicative of a certain directional component of gravity varying with a rotation of the corresponding tire 2. Then, the operation mode switching unit 22 switches the operation mode of the corresponding one of the tire pressure detectors 4a to 4d in accordance with the travel status. Accordingly, the tire mounting positions are determined in a travel status suitable for the tire mounting positions.

(7) The operation mode switching unit 22 first switches the corresponding one of the tire pressure detectors 4a to 4d to the automatic location preparation mode when the vehicle velocity V becomes less than the first threshold. In the automatic location preparation mode, the tire pressure detectors 4a to 4d finely samples the detection signals of the corresponding acceleration sensors 10 to determine the travel status but does not transmit the notification signal Spk. This reduces the power consumed by the tire pressure detectors 4a to 4d and prolongs the battery life.

(8) The interval Tu from the first determination timing t1 to the second determination timing t2 is set to a length during which a rotation amount difference is assumed to be produced between the inner and outer wheels. When a rotation amount difference is produced between the inner and outer wheels, the relationship of the rotation positions of the tires 2 at the second determination timing t2 deviates from the relationship of the rotation positions of the tires 2 at the first determination timing t1. The same applies to the axles 18. This allows for the position determination unit 30 to readily determine the tire mounting positions with high accuracy.

(9) Each of the tire pressure detectors 4a to 4d transmits a notification signal Spk when detecting a characteristic point in the detection signal of the corresponding acceleration sensor 10 that is indicative of a certain directional component of gravity varying with a rotation of the corresponding tire 2. This allows for the position determination processing unit (27, 28) to determine the rotation position of the tire from the transmission timing of the notification signal Spk.

(10) The receiver 12 includes the position determination unit 30 that determines the tire mounting positions by comparing the detector rotation angle θa, which is indicative of rotation variations in the tire pressure detectors 4 between the determination timings t1 and t2, and the axle rotation angle θb, which is indicative of rotation variations in the axles 18 between the determination timings t1 and t2.

(11) The receiver 12 includes the position determination processing unit (27, 28) that calculates the detector angle θk of each of the tire pressure detectors 4a to 4d from the axle rotation amount C of the representative wheel 26 when receiving the notification signal Spk. This improves the calculation accuracy of each detector angle θk and the calculation accuracy of the detector rotation angle θa.

A second embodiment will now be described focusing on features that differ from the first embodiment. The second embodiment differs from the first embodiment in how a characteristic point in the detection signal of the acceleration sensor 10 is detected.

Figure 12:
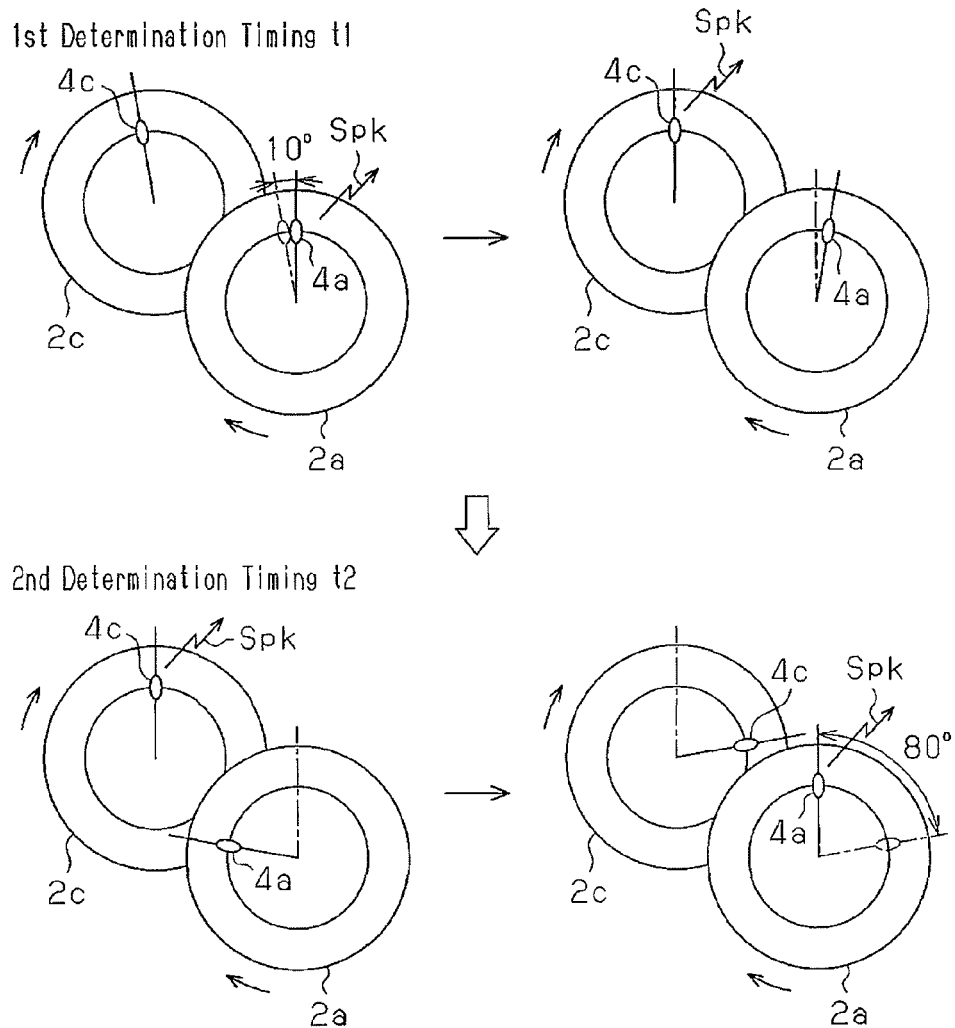
FIG. 12 is a schematic diagram illustrating a tire position determination method in a second embodiment.
Figure 13:
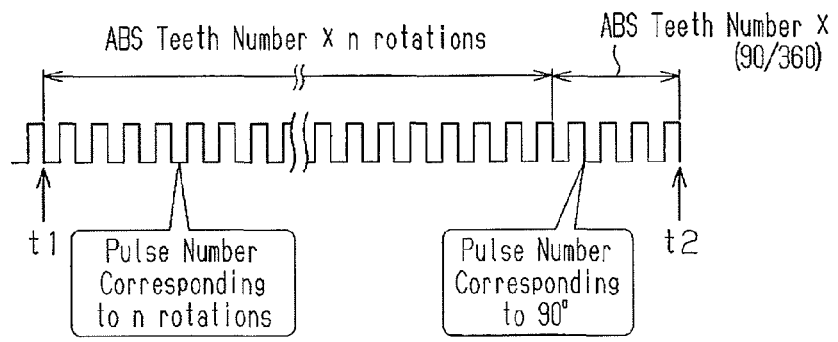
FIG. 13 is a waveform chart illustrating a pulse signal Spl of an axle rotation amount sensor of which pulses are counted between timing t1 and timing t2 shown in FIG. 12.

FIGS. 12 and 13 schematically show the tire position determination method of the second embodiment. As shown in FIG. 12, at the first determination timing t1, the right front tire pressure detector 4a has a 10 degree angle difference (phase difference) from the right rear tire pressure detector 4c. When the right front tire pressure detector 4a is located at a reference position (twelve o'clock position), the right rear tire pressure detector 4c is deviated from the reference position by −10 degrees. At the first determination timing t1, the right front tire pressure detector 4a, which is located at the twelve o'clock position, transmits the notification signal Spk, which includes an ID. Then, when the tires 2a and 2c are rotated by 10 degrees, the right rear tire pressure detector 4c reaches the twelve o'clock position and transmits the notification signal Spk.

At the first determination timing t1, the receiver 12 acquires an axle rotation amount Cn of the axle rotation amount sensor 19 associated with the representative wheel 26 at a first determination timing t1 when the receiver 12 receives a notification signal Spk from the right front tire pressure detector 4a and when the receiver 12 receives a notification signal Spk from the right rear tire pressure detector 4c. The difference between the axle rotation amounts Cn corresponding to these different notification signals Spk is indicative of the angle difference between the two tire pressure detectors 4a and 4c at the first determination timing t1. In the illustrated example, the right rear tire pressure detector 4c has a −10 degree difference from the right front tire pressure detector 4a.

Then, the vehicle 1 may be turned as it travels and produce a rotation amount difference between the right front tire 2a and the right rear tire 2c. For example, the phase of the right rear tire pressure detector 4c may be advanced by 90 degrees from the right front tire pressure detector 4a. In this case, at determination timing t2, the right rear tire pressure detector 4c, which is located at the twelve o'clock position, transmits the notification signal Spk. Then, when the tires 2a and 2c are rotated by 80 degrees, the right front tire pressure detector 4a reaches the twelve o'clock position and transmits a notification signal Spk. In one example, each tire pressure detector 4 is configured to transmit a notification signal Spk in fixed intervals at timings when a characteristic point (e.g., minimum point) is detected in the detection signal of the corresponding acceleration sensor 10 when the vehicle is travelling at the same velocity. In some examples, each tire pressure detector 4 is configured to transmit a notification signal Spk in predetermined cycles (e.g., 60 seconds) regardless of the rotation speed of the tires 2.

At the second determination timing t2, the receiver 12 acquires an axle rotation amount Cn of the axle rotation amount sensor 19 corresponding to the representative wheel 26 when the receiver 12 receives a notification signal Spk from the right rear tire pressure detector 4c and when the receiver 12 receives a notification signal Spk from the right front tire pressure detector 4a. The difference between the axle rotation amounts Cn corresponding to the different notification signals Spk is indicative of the angle difference between the two tire pressure detectors 4a and 4c at the second determination timing t2. In the illustrated example, the right rear tire pressure detector 4c has a +80 degree angle difference from the right front tire pressure detector 4a. By calculating the difference between the angle difference of +80 degrees at the second determination timing t2 and the angle difference of −10 degrees at the first determination timing t1, the detection rotation angle θa (90 degrees) of the right rear tire pressure detector 4c between the determination timings t1 and t2 may be calculated.

Referring to FIG. 13, by calculating the axle rotation amount Cn acquired at the first determination timing t1 and the axle rotation amount Cn acquired at the second determination timing t2, the axle rotation amount Cn varied between the determination timings t1 and t2, namely, the axle rotation angle θb, may be calculated. For example, by checking which one of the axle rotation angles ft conforms to the rotation angle θa of the right rear tire pressure detector 4c including tire ID code ID3, the mounting position of the tire 2 corresponding to the right rear tire pressure detector 4c may be determined.

The determination of the tire mounting positions in the second embodiment will now be described with reference to FIG. 14.

Figure 15:
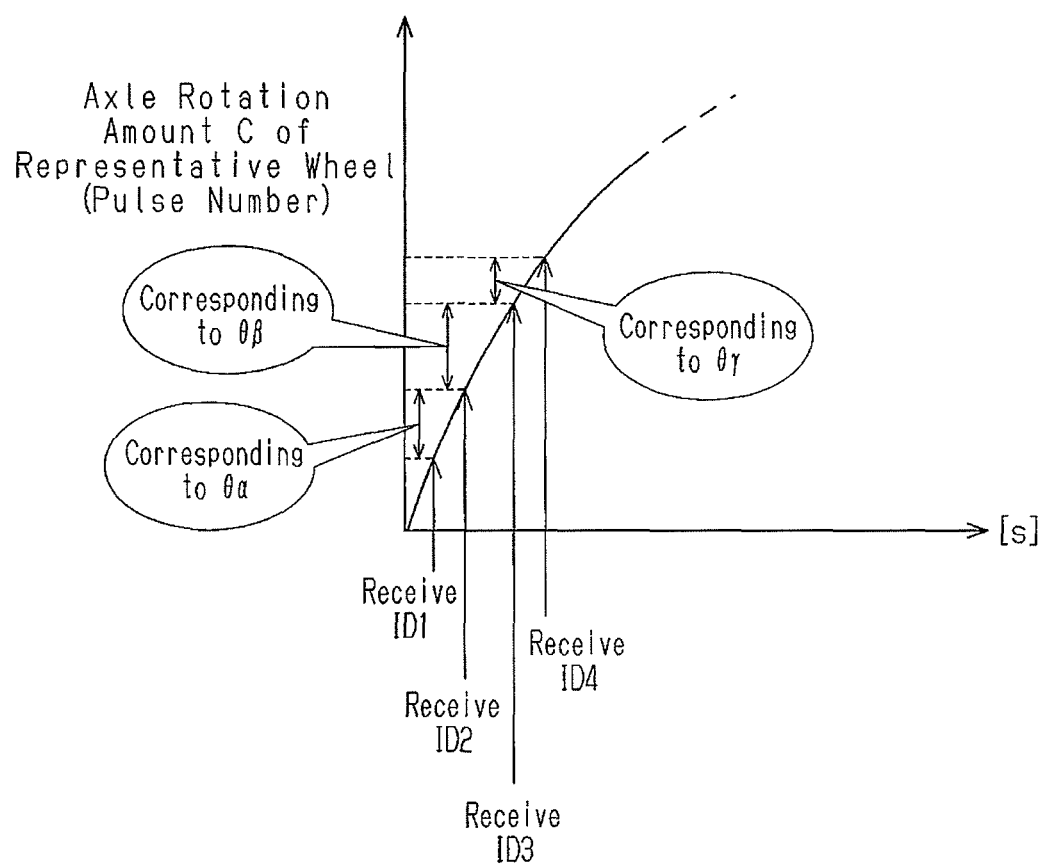
FIG. 15 is a schematic diagram illustrating the count value of a pulse signal from an axle rotation amount sensor corresponding to the specific example of FIG. 14 and the transmission timing of a notification signal Spk from the tire pressure detector.

As shown in FIGS. 14 and 15, at the first determination timing t1, when the right front tire pressure detector 4a is located at the twelve o'clock position, the right front tire pressure detector 4a transmits a notification signal Spk including ID1 to the receiver 12. When the receiver 12 receives the notification signal Spk including tire ID code ID1, the axle rotation amount acquisition unit 25 acquires the axle rotation amount C of the representative wheel 26 in association with the tire ID code. Subsequently, in the same manner, when receiving the notification signals Spk including tire ID codes ID2 to ID4, the axle rotation amount acquisition unit 25 acquires the axle rotation amount C of the representative wheel 26 in association with each tire ID code.

Referring to FIG. 15, the detector angle calculation unit 27 uses the variation in the axle rotation amount C of the representative wheel 26 during the period from when tire ID code ID1 is received to when tire ID code ID2 is received to calculate the angle θα of the tire pressure detector 4a having tire ID code ID1 based on the position of the tire pressure detector 4b having tire ID code ID2. Further, the detector angle calculation unit 27 uses the variation in the axle rotation amount C of the representative wheel 26 during the period from when tire ID code ID2 is received to when tire ID code ID3 is received to calculate the angle θ of the tire pressure detector 4b having tire ID code ID2 based on the position of the tire pressure detector 4c having tire ID code ID3. The detector angle calculation unit 27 uses the variation in the axle rotation amount C of the representative wheel 26 during the period from when tire ID code ID3 is received to when tire ID code ID4 is received to calculate the angle θγ of the tire pressure detector 4c having tire ID code ID3 based on the position of the tire pressure detector 4b having tire ID code ID4.

Referring to FIG. 14, based on the left front tire pressure detector 4b having tire ID code ID4 at the first determination timing t1, the detector angle calculation unit 27 uses the detector angle θα to θγ to calculate the angle θk1 of the other detectors having tire ID codes ID1 to ID3. In the illustrated example, the angle θk1 of the right front tire pressure detector 4a having tire ID code ID1 based on the left front tire pressure detector 4b having tire ID code ID4 is the total value of the detector angles θα, θβ, and θγ. The angle δk1 of the left front tire pressure detector 4b having tire ID code ID2 based on tire ID code ID4 is the total value of the detector angles θβ and θγ. The angle θk1 of the right rear tire pressure detector 4c having tire ID code ID3 based on tire ID code ID4 is the detector angle θγ.

In the same manner as the first determination timing t1, whenever the tire pressure detectors 4a to 4c reach the twelve o'clock position at the second determination timing t2, the tire pressure detectors 4a to 4c transmit notification signals Spk including corresponding IDs. Whenever the receiver 12 receives a tire ID code, the axle rotation amounts C1 to C2 are read from the axle rotation amount sensors 19a to 19d. The detector angle calculation unit 27 calculates the angles θk2 of the other tire pressure detectors having tire ID codes ID1 to ID3.

By obtaining the difference of the detector angle θk1 at the first determination timing t1 and the detector angle δk2 at the second determination timing t2, the detector rotation angle calculation unit 28 calculates the rotation angle θa of the other tire pressure detectors having tire ID codes ID1 to ID3. More specifically, the detector rotation angle θa corresponding to tire ID code ID1 is calculated from the detector angles θk1 and θk2 corresponding to tire ID code ID1, the detector rotation angle θa corresponding to tire ID code ID2 is calculated from the detector angles θk1 and θk2 corresponding to tire ID code ID2, and the detector rotation angle θa corresponding to tire ID code ID3 is calculated from the detector angles θk1 and θk2 corresponding to tire ID code ID3. The detector rotation angle θa corresponding to tire ID code ID4 is based on the tire pressure detector having tire ID code ID4 and is thus zero.

The axle rotation angle calculation unit 29 calculates the axle rotation angle θb of each of the axles 18a to 18d from the difference of the axle rotation amount Cn at the first determination timing t1 and the axle rotation amount Cn at the second determination timing t2. For example, based on tire ID code ID4 finally receiving during a single tire rotation, when calculating the axle rotation angle θb of each of the axles 18a to 18d, the right front axle rotation angle θb is calculated from "C1-14" and "C1-24," the left front axle rotation angle θb is calculated from "C2-14" and "C2-24," the left rear axle rotation angle θb is calculated from "C3-14" and "C3-24," and the left rear axle rotation angle θb is calculated from "C4-14" and "C4-24." The calculation of the axle rotation angle θb does not have to be based on the tire pressure detector having tire ID code ID4 and may be any one of the tire pressure detectors having ID1 to ID3.

The position determination unit 30 determines the mounting positions of the tires 2a to 2d by comparing the detector rotation angle θa and the axle rotation angle θb. By checking which one of the detector rotation angles θa conforms to which one of the axle rotation angles θb, the position determination unit 30 determines the relationship of the tire ID code (detector ID code) and the axle (tire mounting position). Since the detector rotation angle θa of the tire ID code ID4 is zero, the remaining single axle corresponding to the axle rotation angle θb that does not conform to any one of the detector rotation angles θa is determined as corresponding to tire ID code ID4.

In addition to advantages (1), (4), (5), and (8) to (11) of the first embodiment, the second embodiment has the following advantage.

(12) The rotation difference between an inner wheel and an outer wheel does not cause an angle error in the calculation of the detector angle θk. This improves the calculation accuracy of the detector angle θk. As a result, the calculation accuracy of the detector rotation angle θa is improved, and the determination accuracy of the tire mounting position is improved.

A third embodiment will now be described focusing on features that differ from the embodiments described above.

Figure 16:
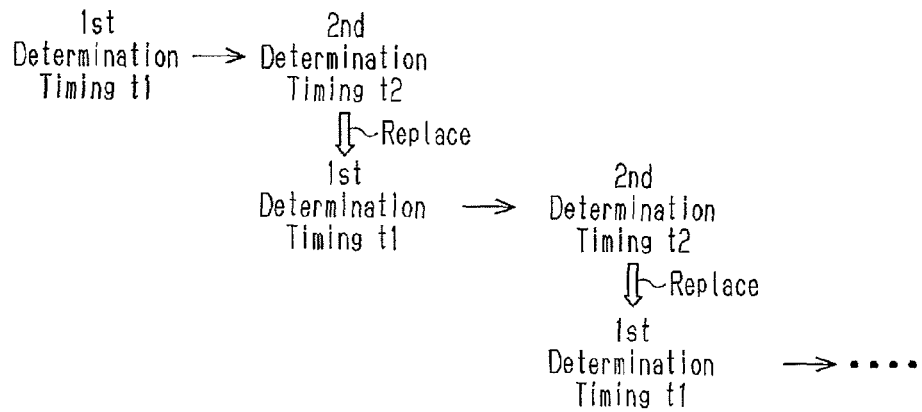
FIGS. 16 and 17 are schematic diagrams illustrating the problem resolved by a tire position determination method of a third embodiment.

For example, when the vehicle 1 is continuously travelling straight over a relatively long period of time, a rotation amount difference between an inner wheel and an outer wheel may not be produced during the period between the first determination timing t1 and the second determination timing t2. In the second embodiment, as long as a rotation difference is not produced between inner and outer wheels, the measurement result of the second determination timing t2 repetitively replaces the measurement result of the next first determination timing t1 (refer to FIG. 16).

Figure 17:
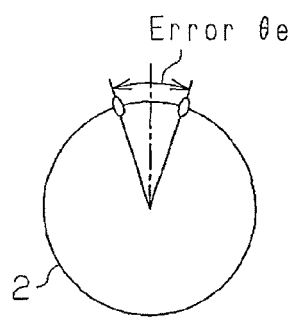

The accumulation of various tolerances in the actual tire pressure detector 4 may result in the tire pressure detector 4 not transmitting a notification signal Spk when reaching the twelve o'clock position. As shown in FIG. 17, the transmission timing of the notification signal Spk may include an error θe. The error θe is the deviated angle from the ideal position shown by the broken lines or the deviated time from the ideal timing corresponding to the ideal position. The error θe is one factor that increases the number of times the tire mounting positions are determined.

Figure 18:
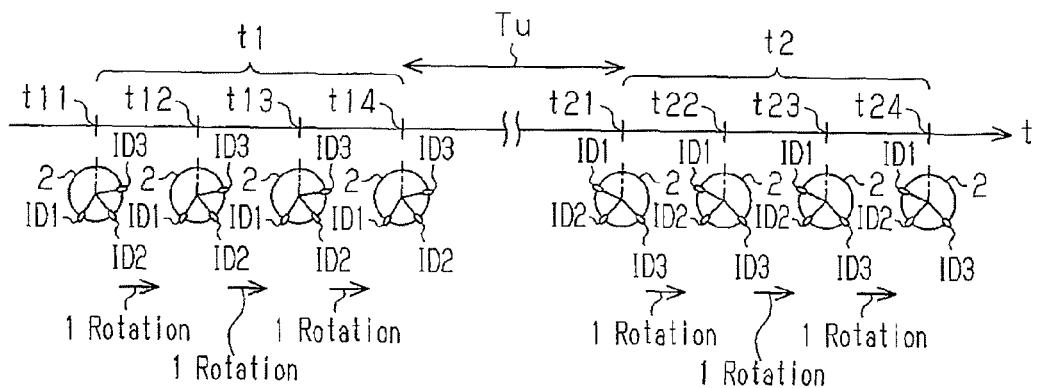
FIG. 18 is a schematic diagram illustrating the tire position determination method of the third embodiment.

Referring to FIG. 18, the determination of the tire mounting positions in the third embodiment will now be described. The tire pressure detectors 4a to 4c (tire ID codes ID1 to ID3) are shown at positions taken when the tire pressure detector 4d (tire ID code ID4) is located at the reference position (twelve o'clock position). Each of the tire pressure detectors 4a to 4c transmit a notification signal Spk when reaching the twelve o'clock position.

Each tire pressure detector 4 transmits a notification signal Spk for a number of times at a first determination timing t1 and a second determination timing t2, which have an interval Tu in between. In the illustrated example, during a first determination timing t1, a tire pressure detector 4 transmits a notification signal Spk at time t11, at time t12 after the tire 2 completes a single rotation from time t11, at time t13 after the tire 2 completes a single rotation from time t12, and at time t14 after the tire 2 completes a single rotation from time t13.

The second determination timing t2 starts subsequent to the first determination timing t1 after an interval Tu, which is when a rotation amount difference may be produced between an inner wheel and an outer wheel. In the second determination timing t2, the tire pressure detectors 4a to 4d are likely to be located at different positions in the tire rotation direction in the first determination timing t1 and the second determination timing t2. Like the first determination timing t1, in the second determination timing t2, a notification signal Spk is transmitted at times t21, t22, t23, and t24.

The position determination unit 30 pairs times t11 to t14 of the first determination timing t1 with times t21 to t24 of the second determination timing t2. Further, the position determination unit 30 determines the tire mounting positions based on the combination of signals (axle rotation amount) at the paired times. For example, when assuming that the first determination timing t1 and the second determination timing t2 are both deviated by the same amount, the position determination unit 30 pairs "t11 and t21", "t12 and t22", and so on. For example, when assuming that only the first determination timing t1 is deviated by a predetermined amount and that the second determination timing t2 is not deviated, the position determination unit 30 pairs "t11 and t12", "t12 and t21", and so on.

Tire position determination will now be described with reference to FIGS. 19 and 20.

As shown in FIG. 19, in the first determination timing t1, the receiver 12 receives the notification signal Spk for a predetermined number of times (e.g., four times). Whenever the axle rotation amount acquisition unit 25 receives the notification signal Spk during the first determination timing t1, the axle rotation amount acquisition unit 25 measures and holds consecutive axle rotation amounts C during the first determination timing t1. In the illustrated example, at time t11, the axle rotation amount C is 20 when the notification signal Spk including tire ID code ID1 is received, the axle rotation amount C is 40 when the notification signal Spk including tire ID code ID2 is received, the axle rotation amount C is 60 when the notification signal Spk including tire ID code ID3 is received, and the axle rotation amount C is 70 when the notification signal Spk including tire ID code ID4 is received. In the same manner, at time t12, the axle rotation amounts C corresponding to tire ID codes ID1 to ID4 are 19, 42, 58, and 71, respectively. Each axle rotation amount C at time t11 and each axle rotation amount C at time t12 are rotation amounts in the same determination timing t1 and thus may be a proximate value deviated from the true value in correspondence with an error caused by the accumulation of tolerances in each detector 4.

The interval between times t11 and t12 corresponds to a single tire rotation. Thus, the possibility is low of a rotation amount difference being produced between an inner wheel and an outer wheel during an interval between times t11 and t12. Thus, the axle rotation amount C corresponding to tire ID code ID1 at time t11 takes substantially the same value as the axle rotation number C corresponding to tire ID code ID1 at time t12. The same applies to the axle rotation amounts C respectively corresponding to the other tire ID codes ID2 to ID4. Accordingly, it is apparent that the determination of the tire mounting positions from the combination of the information acquired at time t11 and the information acquired at time t12 is not realistic.

At determination timing t2, the receiver 12 receives the notification signal Spk for a number of times (e.g., four times). Whenever the axle rotation amount acquisition unit 25 receives a notification signal Spk during the second determination timing t2, the axle rotation amount acquisition unit 25 measures the axle rotation amount C and holds the axle rotation amounts C consecutively measured during the second determination timing t2.

The position determination unit 30 pairs signals (axle rotation amounts) at times t11 to t14 during the first determination timing t1 with times t21 to t24 during the second determination timing t2, and compares the detector rotation angle θa and the axle rotation angle θb to determine the tire mounting positions. For example, the position determination unit 30 pairs times t11 to t14 of the first determination timing t1 with times t21 to t24 of the second determination timing in temporal order from early ones. Referring to FIG. 19, even when a tire mounting position cannot be determined from the first pair (i.e., time t11 and time t21), the tire mounting position may be determined from the second pair (i.e., time t12 and time t22) as long as the second pair (t12 and t22) allows for correct detection of a certain rotation position (e.g., uppermost position) of the tire pressure detector 4.

When the tire mounting position cannot be determined from finally acquired signals of the first determination timing t1 and the second determination timing t2, the tire position determination system 17 uses the finally acquired axle rotation amount of the second determination timing t2 and the next axle rotation amount of the first determination timing t1 to perform a similar tire mounting position determination routine. The above determination routine is repeated until the tire mounting position determination is completed. When the tire mounting position determination is completed, the determination result is stored in the memory 15 as the updated tire mounting position.

Referring to FIG. 20, the error θe1 of a tire pressure detector 4 at the first determination timing t1 should be the same value as the error θe2 of the same tire pressure detector 4 at the second determination timing t2. Accordingly, in a configuration in which each transmitter 4 transmits the notification signal Spk only once in each of the first determination timing t1 and the second determination timing t2, accurate determinations may be hindered due to the errors θe1 and θe2. However, in the third embodiment, each transmitter 4 transmits in each of the first determination timing t1 and the second determination timing t2 the notification signal Spk for a number of times and performs measurements at times t11 to t14 and t21 to t24. Thus, coincidentally, the possibility in which the errors θe1 and θe2 may be handled in the same manner as true values increases in the first determination timing t1 and the second determination timing t2. Accordingly, the determination method of the third embodiment is advantageous in that the tire position determination is accurate.

In addition to advantages (1) to (12) of the first and second embodiments, the third embodiment has the following advantage.

(13) In each of the first and second determination timings t1 and t2, the tire mounting position determination routine is performed a number of times. This completes the determination of the tire mounting positions at an early stage.

A fourth embodiment will now be described focusing on features that differ from the embodiments described above.

Figure 21:
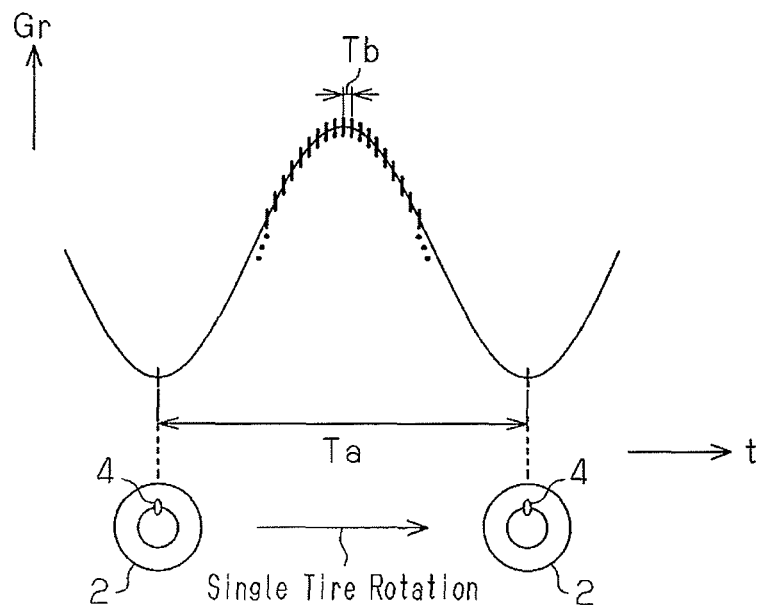
FIG. 21 is a schematic diagram illustrating the problem resolved by a tire position determination method of a fourth embodiment.

As shown in FIG. 21, to accurately detect the characteristic point of the centripetal component of gravity Gr, a sampling cycle Tb of the centripetal component of gravity Gr is set to be sufficiently shorter than the cycle Ta of a single tire rotation. However, as the sampling cycle Tb of the centripetal component of gravity Gr becomes shorter, the acceleration sensor 10 is activated more frequently, and the power consumption of the tire pressure detector 4 is increased.

Figure 22:
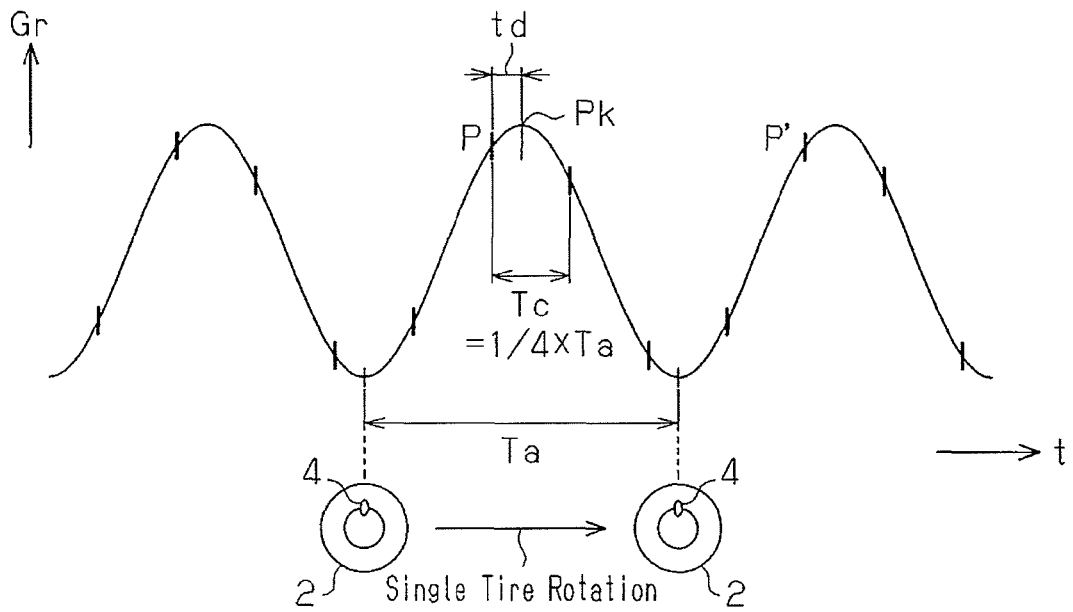
FIG. 22 is a schematic diagram illustrating a sampling cycle in the fourth embodiment.

Accordingly, referring to FIG. 22, in the fourth embodiment, the sampling cycle Tc of the centripetal component of gravity Gr is a variable value that varies in accordance with the cycle Ta of a single tire rotation. Tc=Ta/n (where n is a natural number). The sampling cycle Tc is set to be one-half or less of the cycle Ta of a single tire rotation but longer than the cycle Tb. The sampling cycle Tc is set to be one-half or less of the cycle Ta of a single tire rotation, and n is set to 4 in the example of FIG. 22. The cycle of a single tire rotation cycle Ta may be calculated from the axle rotation amount (pulse number) output from the axle rotation amount sensor 19.

When extending the sampling cycle Tc of the centripetal component of gravity Gr, actual characteristic point may be detected at point P that is deviated from the actual characteristic point Pk by time td. However, the rotation cycle Ta of a single tire rotation may be calculated from the axle rotation amount C and n is a constant number. Thus, as long as the sampling cycle Tc satisfies "Tc=Ta/n," the interval between point P, which is detected last, and point P', which is detected next, is the same as the cycle Ta, that is, the cycle between characteristic points of the true centripetal component of gravity Gr. Thus, even when prolonging the sampling cycle Tc of the centripetal component of gravity Gr in accordance with "Tc=Ta/n," the same result is obtained as when determining the tire mounting position based on the centripetal component of gravity Gr.

In addition to advantages (1) to (4), (6) to (8), and (10) to (13) of the first to third embodiments, the fourth embodiment has the advantages described below.

(14) The sampling cycle Tc of the centripetal component of gravity Gr is set to be shorter than the cycle Ta of a single rotation of the tire 2 in accordance with "Tc=Ta/n." Thus, the tire mounting position may be determined, while reducing power consumption of the tire pressure detector 4.

(15) The characteristic point detection unit 23 and the notification signal transmission unit 24 may be omitted from the tire pressure detector 4.

A fifth embodiment will now be described focusing on features that differ from the embodiments described above.

Figure 23:
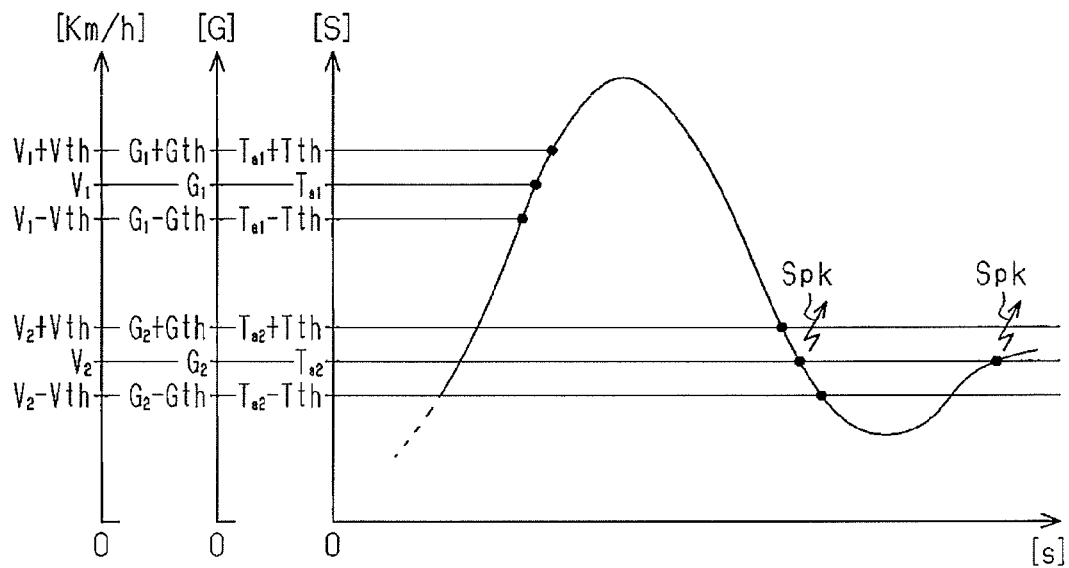
FIG. 23 is a timing chart illustrating the relationship of the centripetal component of gravity, the tire rotation cycle, and the vehicle velocity, for the fifth embodiment.

Referring to FIG. 23, the centripetal component of gravity Gr may be converted to the rotation cycle Ta of the tire 2 and the vehicle velocity V. For example, a peak-to-peak interval of the centripetal component of gravity Gr is indicative of the tire rotation cycle Ta. The vehicle velocity V may be calculated from the tire rotation cycle Ta and the tire diameter. In the example of FIG. 23, centripetal component of gravity $Gr_1$ corresponds to rotation cycle $Ta_1$ and vehicle velocity $V_1$.

When determining the tire position in the present example, the tire pressure detectors 4a to 4d of all four wheels have to transmit radio wave signals (notification signals Spk) during the period the corresponding tire 2 rotates once. However, the present acceleration sensor 10 cannot detect the absolute value of the centripetal component of gravity Gr with high accuracy. For example, even if each of the tire pressure detectors 4a to 4d are programmed to transmit the notification signal Spk when the centripetal component of gravity Gr indicates a predetermined value, a certain number of tire pressure detectors may not transmit the radio wave signal Spk.

In contrast, the characteristic points of the centripetal component of gravity Gr may be accurately detected. That is, the rotation cycle Ta may be accurately calculated. In the fifth embodiment, since the detection accuracy of the acceleration sensor 10 is relatively low, a relatively large range G1±Gth (Gth>>1) is set in advance for the centripetal component of gravity Gr. Further, to lower power consumption of the tire pressure detector, the sampling cycle of the centripetal component of gravity Gr is prolonged before the centripetal component of gravity Gr reaches the determination range G1±Gth. The width Tt of the rotation cycle Ta and the width Vth of the vehicle velocity V correspond to the width Gth.

When the detected centripetal component of gravity Gr is in the range of G1±Gth, the characteristic point detection unit 23 samples the centripetal component of gravity Gr in relatively short sampling cycles and measures the peak-to-peak interval to calculate the centripetal component of gravity Gr. The normal sampling cycle of the centripetal component of gravity Gr is set to be long. When the centripetal component of gravity Gr exceeds the determination range G1±Gth, the sampling cycle of the centripetal component of gravity Gr is switched to a short value. Thus, the centripetal component of gravity Gr is sampled many times only when truly necessary to determine the tire mounting positions. This reduces power consumption of the tire pressure detectors 4a to 4d while improving the peak detection accuracy.

In one example, the notification signal transmission unit 24 transmits a notification signal Spk when the calculated rotation cycle Ta is in a predetermined rotation cycle range (e.g., Ta2±ΔT). In this manner, each of the tire pressure detectors 4a to 4d is set to transmit a notification signal Spk in accordance with the rotation cycle Ta calculated from the peak-to-peak interval. Thus, the notification signal Spk is transmitted from each of the four wheels at substantially the same timing. This shortens the time used to determine the tire mounting positions.

Figure 24:
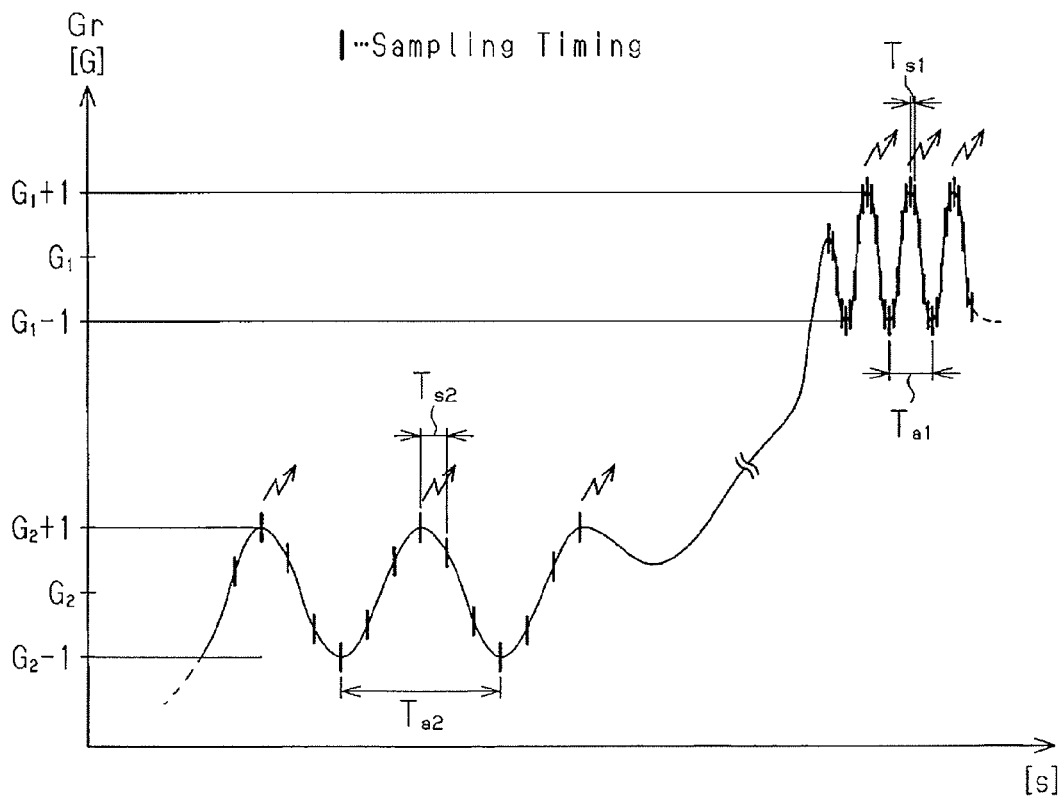
FIG. 24 is a waveform chart of the centripetal component of gravity, for the fifth embodiment.

In the example shown in FIG. 24, the centripetal component of gravity Gr is provided with a number of determination ranges (G1±1, G2±1). When the characteristic point detection unit 23 is ready to calculate the rotation cycle Ta, the sampling cycle of the centripetal component of gravity Gr is switched in accordance with the rotation cycle T. For example, when the rotation cycle Ta is Ta1 and relatively short, the characteristic point detection unit 23 sets a relatively short sampling cycle (Ts1) for the centripetal component of gravity Gr. When the rotation cycle Ta is Ta2 (>Ta1) and relatively long, the characteristic point detection unit 23 sets the sampling cycle of the centripetal component of gravity Gr to Ts2 (>Ts1), which is relatively long. The sampling cycle of the centripetal component of gravity Gr is optimized in accordance with the present tire rotation cycle Ta. This reduces power consumption of the tire pressure detectors 4a to 4d.

In addition to advantages (1) to (15) of the first to fourth embodiments, the fifth embodiment has the advantages described below.

(16) The acceleration sensor 10 may not be able to detect the absolute value of the centripetal component of gravity Gr with high accuracy. Considering that the acceleration sensor 10 has a rough detection accuracy, the tire pressure detector 4 is provided with the determination range G1±Gth for the centripetal component of gravity Gr. When the centripetal component of gravity Gr is in the determination range G1±Gth, the tire pressure detector 4 starts peak-to-peak measurement and calculates the rotation cycle Ta of the tire 2. When the rotation cycle Ta is in a predetermined rotation cycle range (e.g., Ta2±ΔT), the tire pressure detector 4 transmits the notification signal Spk. In this manner, instead of the absolute value of the detection signal of the acceleration sensor 10, the tire pressure detector 4 uses the rotation cycle Ta of the tire 2 that may be accurately detected from variations in the detection signal of the acceleration sensor to transmit notification signals Spk at a determined timing. Thus, the tire pressure detector 4 may accurately transmit the notification signal Spk. In this manner, repetitive transmission of unnecessary radio wave signals that cannot be used for tire mounting position determination is obviated or reduced. This prolongs the battery life of the tire pressure detector 4.

(17) The centripetal component of gravity Gr is provided with plurality of determination ranges G1±1 and G2±1, and the rotation cycle Ta is provided with a plurality of ranges. Further, the sampling cycle of the centripetal component of gravity Gr is switched in accordance with the present tire rotation cycle Ta. Further, the sampling cycle of the centripetal component of gravity Gr is switched in accordance with the rotation cycle Ta of the tire 2. The centripetal component of gravity Gr is sampled at an appropriate sampling cycle that is in accordance with the rotation cycle Ta of the tire 2. This improves the transmission timing accuracy of radio wave signals from the tire pressure detector 4. Further, the time used for tire mounting position determination may be shortened, and the battery life of the tire pressure detector 4 may be prolonged.

A sixth embodiment will now be described focusing on features that differ from the embodiments described above.

Figure 25:
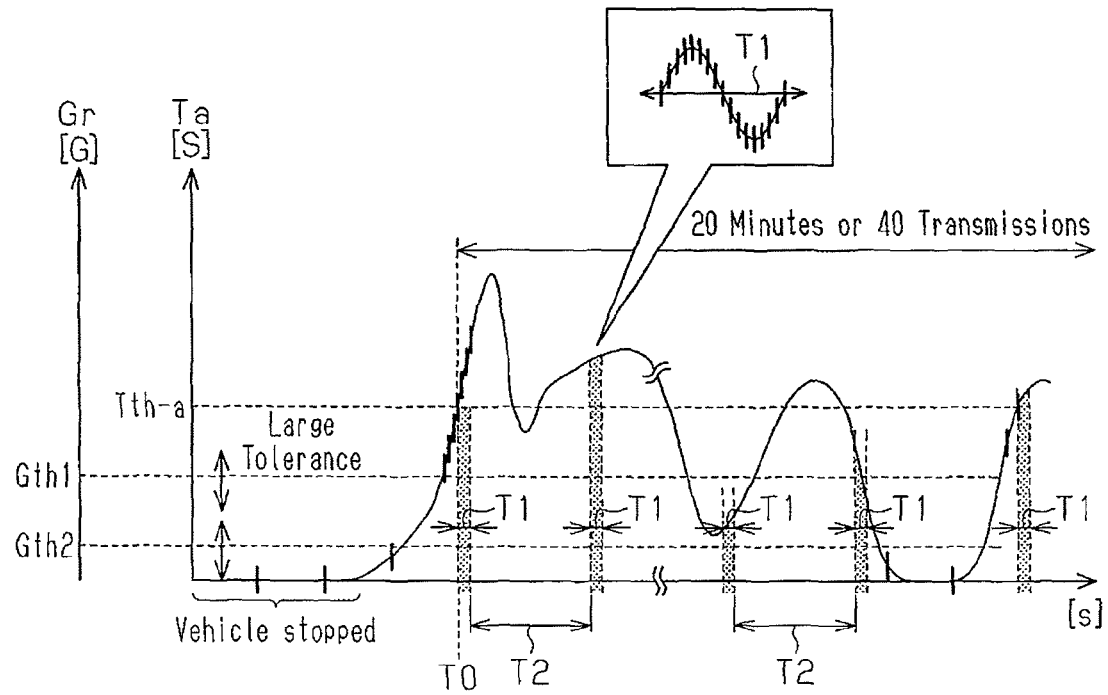
FIG. 25 is a waveform chart illustrating the gravity and the rotation cycle in a sixth embodiment.

Referring to FIG. 25, when the detection value of the acceleration sensor 10, which has a rough detection accuracy, becomes greater than or equal to threshold Gth1, the characteristic point detection unit 23 shortens the sampling cycle (e.g., approximately 10 ms) for the centripetal component of gravity Gr of the acceleration sensor 10 and starts accurate measurement of the rotation cycle Ta of the tire 2. The characteristic point detection unit 23 sets the time when the measured rotation cycle Ta first becomes greater than or equal to a threshold Tth-a as a time origin point T0 for the tire pressure detector 4. For example, the characteristic point detection unit 23 resets an internal timer when the rotation cycle T becomes greater than or equal to threshold Tth-a and starts measuring time.

The tire pressure detector 4 is allowed to transmit radio wave signals until a transmission permission period T1 from the time origin point T0 expires. Preferably, the transmission permission period T1 is, for example, about one second and short. The sampling cycle of the centripetal component of gravity Gr during the transmission permission period T1 may be the same as the short cycle (e.g., about 10 ms) in which the centripetal component of gravity Gr exceeds the Gth1-a or may be even shorter. During the transmission permission period T1, the tire pressure detector 4 transmits a notification signal Spk to the receiver 12 whenever the tire pressure detector 4 reaches the twelve o'clock position. The tire pressure detectors 4a to 4d of the wheels are synchronized with respect to time by the rotation cycle Ta of the tire. This allows for the notification signal Spk to be transmitted at substantially the same timing.

When the transmission permission period T1 expires, the tire pressure detector 4 does not transmit any radio wave signals during the following transmission suspension period T2. Preferably, the transmission suspension period T2 is, for example, about 30 seconds and long. The sampling cycle of the centripetal component of gravity Gr during the transmission suspension period T2 may be extremely long such as about 3 to 20 seconds. This allows for the power consumption of the tire pressure detector 4 to be reduced.

When the tire pressure detector 4 enters the transmission permission period T1 again, the tire pressure detector 4 shortens the sampling cycle of the centripetal component of gravity Gr again (e.g., about 10 ms). In this manner, when entering the transmission permission period T1 again, the tire pressure detector 4 allows for a notification signal Spk to be accurately transmitted to the receiver 12 when the tire pressure detector 4 reaches the twelve o'clock position. Subsequently, the transmission permission period T1 and the transmission suspension period T2 are repeated.

In another example, when the centripetal component of gravity Gr becomes less than or equal to the threshold Gth2 (≈0), the tire pressure detector 4 stops the transmission performed every 30 seconds and enters a standby state. The next time the centripetal component of gravity Gr becomes greater than or equal to the threshold Gth1, the tire pressure detector 4 starts synchronization again. In this case, accumulative errors from the time origin point T0 are cancelled in the tire pressure detectors 4. This is advantageous for accurately measuring time. Further, radio wave signals are transmitted from the tire pressure detector 4 less frequently, and the power consumption of the tire pressure detector 4 is reduced.

Figure 26:
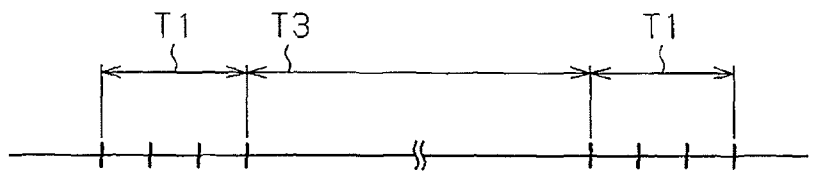
FIG. 26 is a schematic diagram illustrating the end of a transmission in the tire pressure detector.

Referring to FIG. 26, if the estimated time for completing automatic location (e.g., 20 minutes) elapses from when the time origin point T is set or if the number of radio wave signal transmissions from the tire pressure detector 4 becomes greater than or equal to an upper limit value (e.g., 40 times), the tire pressure detector 4 may switch the transmission suspension period T2 to a second transmission suspension period T3 that is longer than the default transmission suspension period T2. In the preferred example, the second transmission suspension period T3 is an additional time of 60 seconds plus a random time length. Except for the point in that the transmission suspension period T2 is extended, the operation of the tire pressure detector 4 is as described above.

When the vehicle is travelling at a low speed, the tire 2 may not be rotated once during the transmission permission period T1. Thus, the tire pressure detectors 4 may include those that transmit a radio wave signal once during the transmission permission period T1 and those that do not. Accordingly, in some examples, when the measured rotation cycle Ta is less than or equal to a tolerable value (e.g., 240 ms), the tire pressure detector 4 that has not detected a peak may transmit a notification signal Spk (frame) including non-peak information (no-peak flag or the like) at a certain bit in short time intervals (e.g., 10 ms), and the tire pressure detectors 4 may all transmit a radio wave signal at least once during the transmission permission period T1. In this manner, upper and lower limits for the number of radio wave signal transmissions are unnecessary during the automatic location period.

The sixth embodiment has the advantages described below in addition to advantages (1) to (17) of the first to fifth embodiments.

(18) When the centripetal component of gravity Gr is greater than or equal to the threshold Gth1, the sampling cycle of the centripetal component of gravity Gr is shortened when calculating the rotation cycle Ta of the tire 2. The tire pressure detectors 4a to 4d are synchronized with the rotation cycle Ta. Thus, radio waves may be accurately transmitted from the tire pressure detectors 4a to 4d. This allows for the transmission of a radio wave signal from each of the tire pressure detectors 4a to 4d at each peak during a single rotation of the tire 2. Thus, a radio wave signal used for tire position determination may be readily received. This further prolongs the battery life of the tire pressure detector 4.

(19) When the centripetal component of gravity Gr becomes lower than the threshold Gth2, the tire pressure detector 4 suspends the radio wave signal transmission performed every 30 seconds. Then, the tire pressure detector 4 sets the time origin point T0 as a starting point. This allows for the cancellation of errors accumulated from the previous time origin point T0 to be cancelled.

(20) When the estimated time for completing automatic location from the time origin point T0 ends, the time during which the radio wave signal transmission is suspended may be extended from, for example, 30 seconds to 60 seconds. This allows for radio wave signals to be transmitted less frequently from the tire pressure detector 4 and further prolongs the battery life of the tire pressure detector 4.

(21) When the vehicle is travelling at a low velocity, the tire pressure detector 4 may not be able to transmit radio wave signals for a specified amount (e.g., four times) with the normal interval. In this case, when the rotation cycle Ta is 240 ms or less, a non-peak flag is set, and the remaining three radio wave signals are transmitted at 110 ms or less. Thus, even when the vehicle is travelling at a low velocity, the remaining three radio wave signals are transmitted at 110 ms or less. This allows for the tire pressure detector 4 to transmit radio wave signals for the determined number of times even when the vehicle velocity is low.

A seventh embodiment will now be described focusing on differences from the above embodiments.

Figure 27:
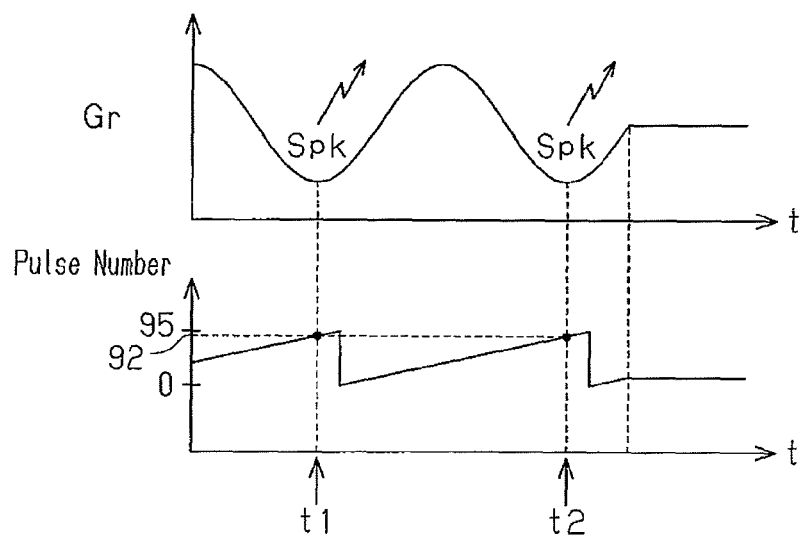
FIG. 27 is a schematic diagram illustrating determination timings in a seventh embodiment.

Referring to FIG. 27, in a tire pressure detector 4, the axle rotation amount C (pulse number) generated from when a notification signal Spk is transmitted (first determination timing t1) to when the next notification signal Spk is transmitted (second determination timing t2) would be the axle rotation amount Cn for a single rotation when there is a conforming axle 18 (tire 2). This is because each of the tire pressure detectors 4a to 4d transmits a notification signal Spk when the vehicle is about to stop. However, when the steering angle is large, the axle rotation amount C of each wheel differs greatly due to the rotation amount difference between an inner wheel and an outer wheel.

Thus, the axles 18a to 18d may be associated with the tire codes ID1 to ID4 by performing counting operations with the axle rotation amount sensors 19a to 19d of the tires 2a to 2d and using the axle rotation amount Cn from one peak to another peak of a received ID to check whether the axle rotation amount conforms to the rotation amount of a single rotation (e.g., 96 counts) of any one of the tires 2a to 2d. The axles 18a to 18d may also be associated with the tire codes ID1 to ID4. In the present example, this principle is used to determine the tire position.

The tire ID received between two peaks always has the same pulse number. In the example of FIG. 27, the right rear axle 18c is "92." This is not limited to a single tire rotation and also occurs for n rotations. Thus, the tire rotation amount during determination is not necessarily limited to a single tire rotation.

Figure 28:
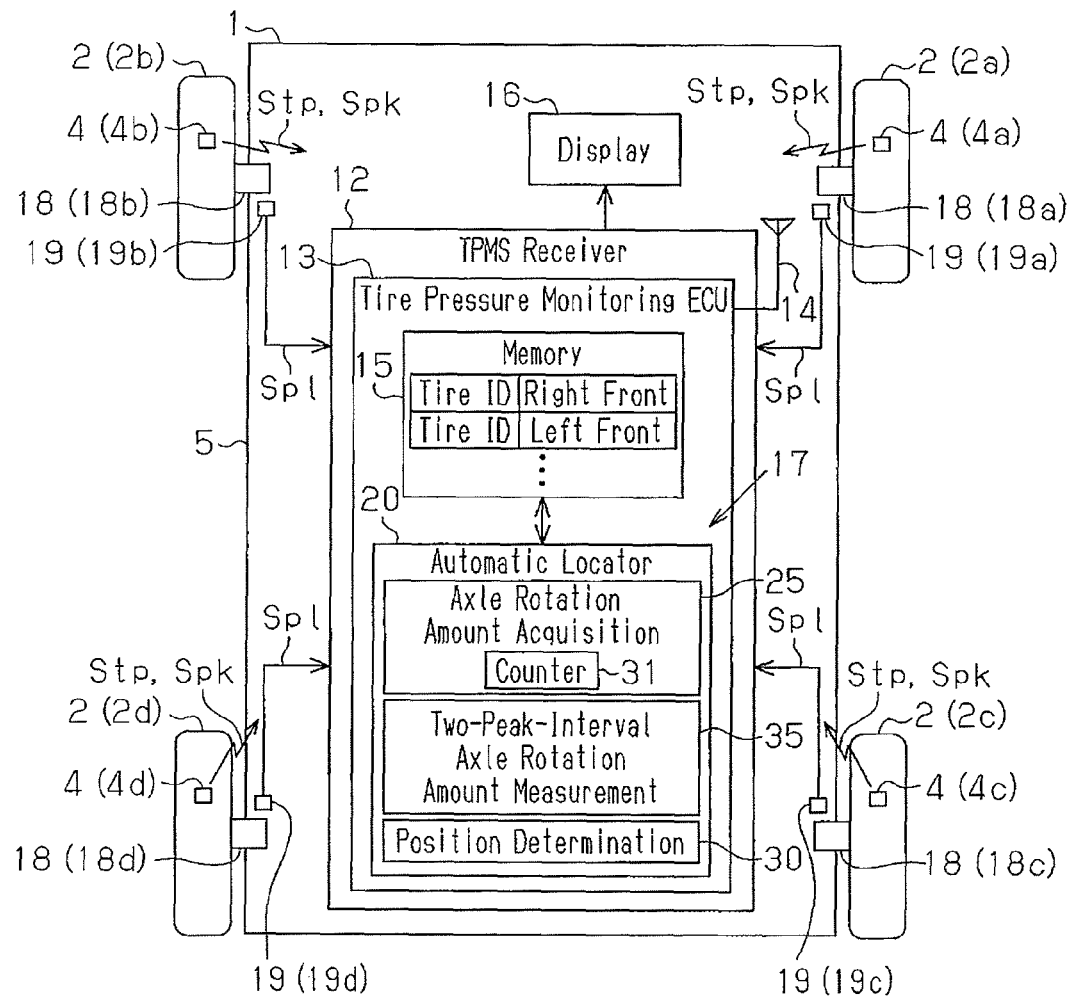
FIG. 28 is a schematic diagram illustrating a tire determination system of the seventh embodiment.

Referring to FIG. 28, the automatic locator 20 includes a two-peak-interval axle rotation amount measurement unit 35 that measures the axle rotation amount Cn from when a notification signal Spk is received to when the next notification signal Spk is received. The two-peak-interval axle rotation amount measurement unit 35 measures the axle rotation amount Cn between two consecutively received notification signals Spk (peak-to-peak) for each of the tire codes ID1 to ID4. The position determination unit 30 determines the mounting positions of the tires 2a to 2d by comparing an ID code received between two peaks with the axle rotation amount Cn measured by the two-peak-interval axle rotation amount measurement unit 35.

The tire position determination operation will now be described with reference to FIG. 29.

Figure 29:
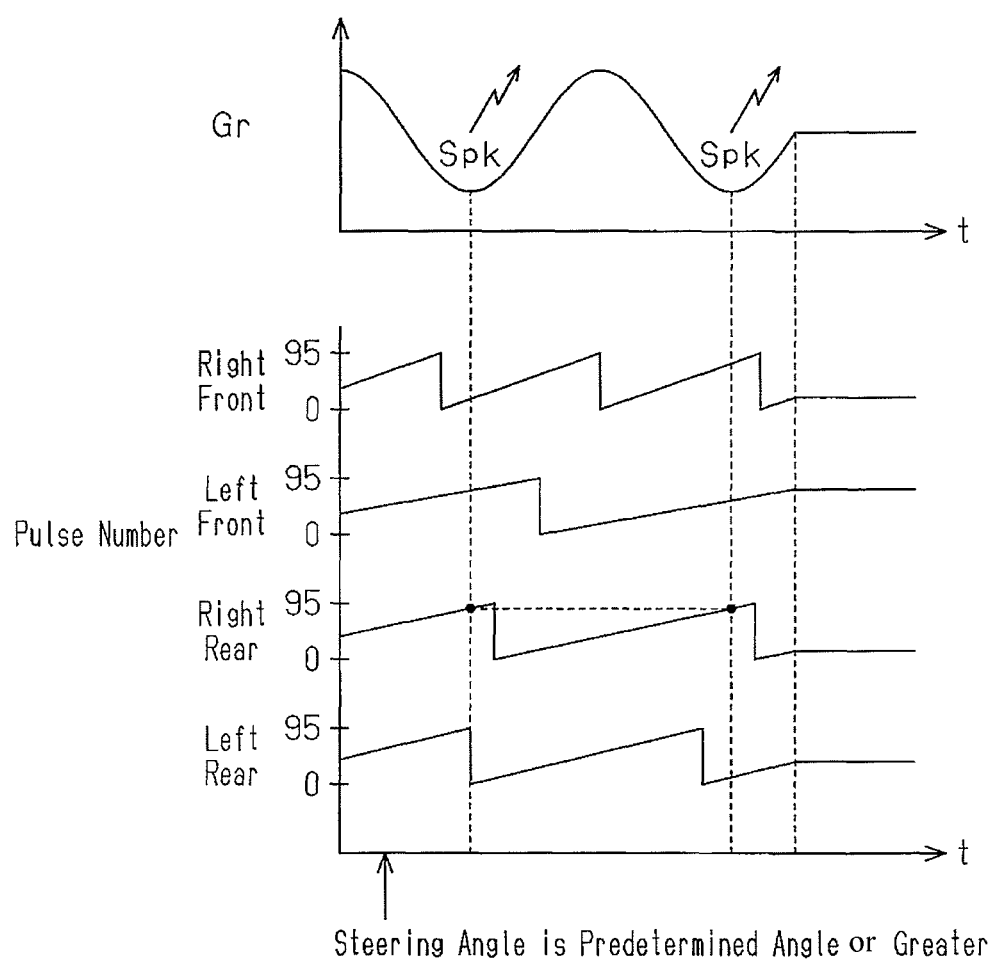
FIG. 29 is a schematic diagram illustrating determination timings in the seventh embodiment.

As shown in FIG. 29, when the two-peak-interval axle rotation amount measurement unit 35 receives the notification signal Spk of a tire ID, the two-peak-interval axle rotation amount measurement unit 35 acquires the pulse number of each of the axle rotation amount sensors 19a to 19d at the first determination timing t1, which is based on a peak reception. Further, when the two-peak-interval axle rotation amount measurement unit 35 receives the next consecutive notification signal Spk of a tire ID, the two-peak-interval axle rotation amount measurement unit 35 acquires the pulse number of each of the axle rotation amount sensors 19a to 19d at the second determination timing t2, which is based on a peak reception, in the same manner. The two-peak-interval axle rotation amount measurement unit 35 obtains a pulse number difference between the first determination timing t1 and the second determination timing t2. The position determination unit 30 associates the tire ID received peak-to-peak to determine a tire position.

In the example of FIG. 29, the pulse number of the right front axle 18a exceeds "95," the pulse number of the right rear axle 18c is exactly "95," and the pulse number of the left front axle 18b is less than "95," and the pulse number of the left rear axle 18d exceeds "95." Thus, when detecting two consecutive peaks in the received ID code, the right rear axle 18c having pulse number "96" that corresponds to a single tire rotation is determined as corresponding to the received tire ID that is about to be determined, and the two are associated with each other. This process is performed for the other wheels to locate the four wheels.

In the present example, the sampling cycle of the centripetal component of gravity Gr may be set like in the fourth embodiment. In this case, when setting the sampling cycle Tc of the centripetal component of gravity Gr to "Ta/n," n is a natural number. Thus, there would be an infinite number of sampling cycles Tc. For this reason, even when the sampling cycle Tc does not satisfy "Ta/n," the processing may be repeated a number of times so that a value satisfying "Ta/n" would be coincidentally taken thereby allowing for the determination of a tire position. The determination probability will become low but the tire positions may be satisfied when "Tc=Ta/n" is coincidentally satisfied. In this manner, in broad terms, the present example includes a case in which the sampling cycle Tc takes a value that does not satisfy "Ta/n."

In addition to advantages (1) to (21) of the first to sixth embodiments, the seventh embodiment has the advantages described below.

(22) Tire positions may be determined just by comparing the time used to receive the notification signal Spk twice and the pulse numbers obtained in this time. Thus, the tire positions may be determined within a short period.

(23) A tire position may be determined just by consecutively transmitting the notification signal Spk two times. Thus, the tire positions may be determined within a short period.

An eighth embodiment will now be described focusing on differences from the above embodiments.

Figure 30:
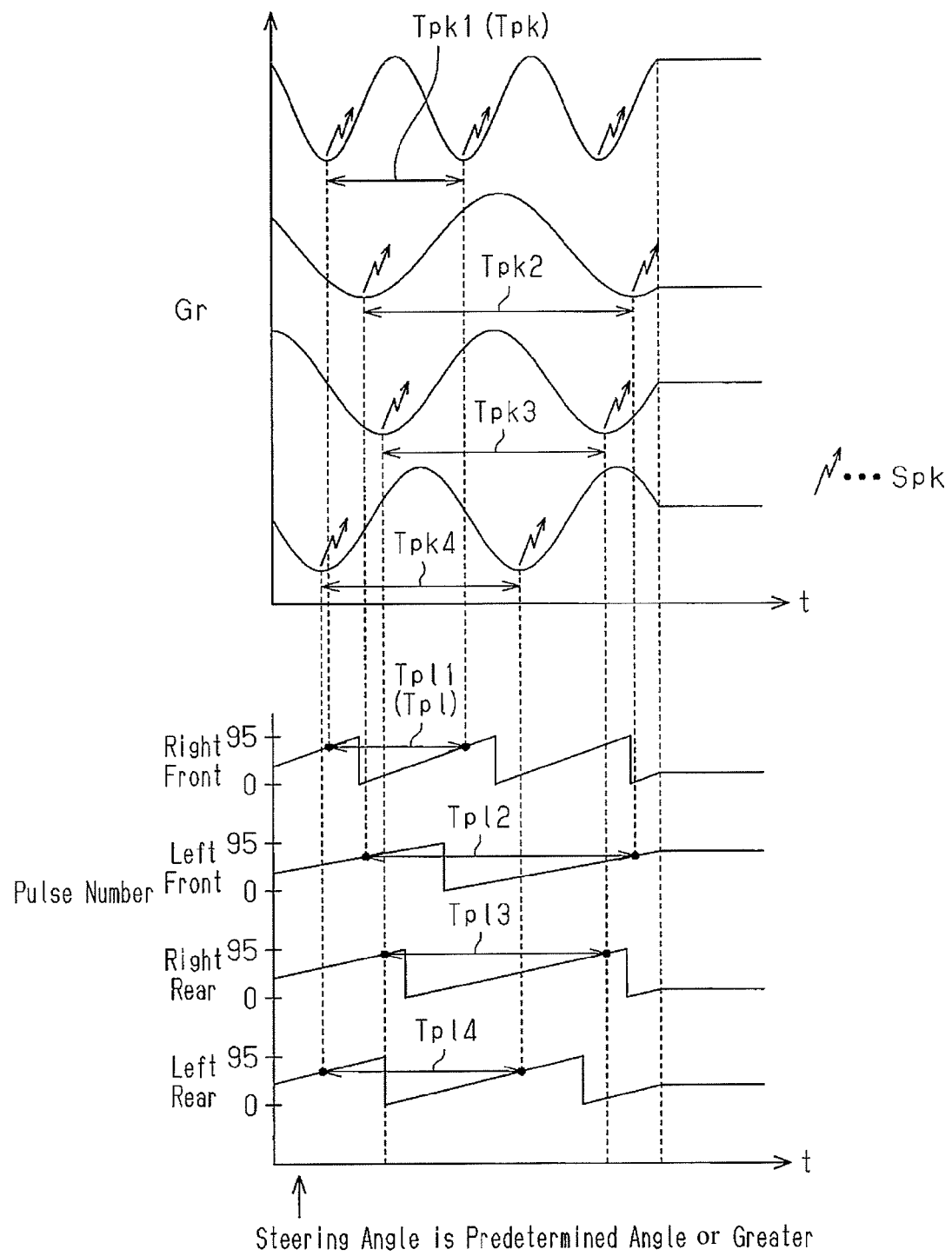
FIG. 30 is a schematic diagram illustrating determination timings in an eighth embodiment.

Referring to FIG. 30, if a rotation amount difference is produced between an inner wheel and an outer wheel, a peak-to-peak time Tpk would take different values in the tire ID codes. In FIG. 30, the notification signal Spk with tire ID code ID1 has the shortest peak-to-peak time Tpk1, the peak-to-peak time Tpk2 for tire ID code ID2 is the longest, the peak-to-peak time Tpk3 of the detection signal of the right rear tire pressure detector 4c having tire ID code ID3 is the third shortest, and the peak-to-peak time Tpk4 for tire ID code ID4 is the second shortest.

Further, if a rotation amount difference is produced between an inner wheel and an outer wheel, the maximum value of the axle rotation amount C, that is, the rotation amount cycle Tpl, which is the number of pulses during a single rotation, takes different values in the axles 18a and 18d.

In FIG. 30, the rotation amount cycle Tpl1 of the right front axle 18a takes the shortest time, the rotation amount cycle Tpl2 of the left front axle 18b takes the longest time, the rotation amount cycle Tpl3 of the right rear axle 18c takes the third shortest time, and the rotation amount cycle Tpl4 of the left rear axle 18d takes the second shortest time.

In this manner, the order of the peak-to-peak time Tpk and the order of the rotation amount cycle Tpl conform at the same tire position. The present example uses this principle and compares the order of the peak-to-peak time Tpk and the order of the rotation amount cycle Tpl to associate the orders and determine the tire position.

Figure 31:
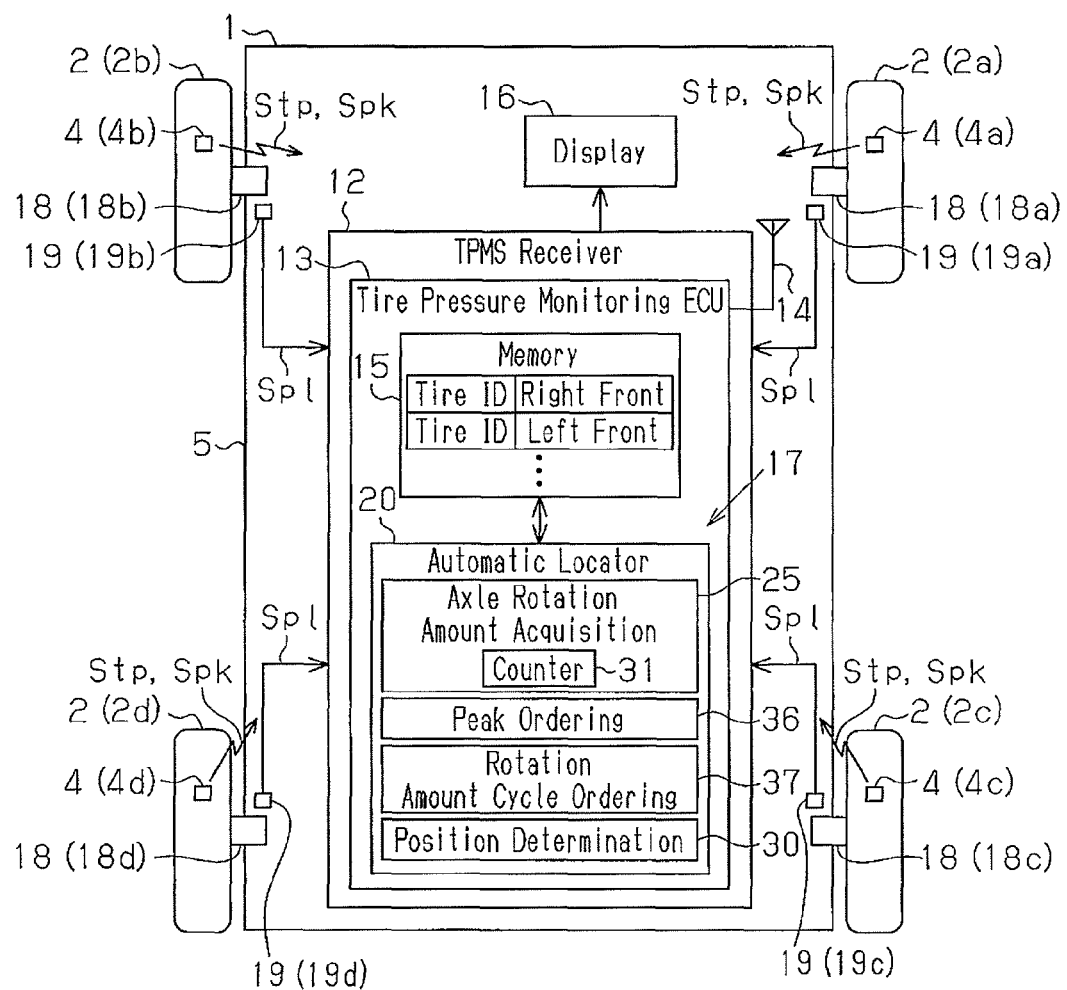
FIG. 31 is a schematic diagram illustrating a tire determination system of the eighth embodiment.

Referring to FIG. 31, the automatic locator 20 includes a peak ordering unit 36, which orders the peak-to-peak times Tpk of the notification signals Spk having the tire ID codes ID1 to ID4, and a rotation amount cycle ordering unit 37, which orders the rotation amount cycles Tpl of the axles 18a to 18d. The position determination unit 30 determines the tire positions based on the peak order obtained by the peak ordering unit 36 and the rotation amount cycle order obtained by the rotation amount cycle ordering unit 37. In the present example, to determine the tire positions under a situation in which a rotation difference is produced between an inner wheel and an outer wheel, the determination process is started when, for example, the steering angle is greater than or equal to a predetermined angle.

The tire position determination will now be described with reference to FIG. 30.

As shown in FIG. 30, when the steering angle is greater than or equal to the predetermined angle, the receiver 12 starts the tire position determination. When the peak ordering unit 36 receives a notification signal Spk of a certain tire ID code, the peak ordering unit 36 measures the time until the notification signal Spk of the next ID is received to measure the peak-to-peak time of the tire ID. When completing the peak-to-peak time measurement for every one of the tire IDs, the peak ordering unit 36 compares and orders the time. When ordered from a shorter time to a longer time, the first one is tire ID1, the second one is tire ID4, the third one is tire ID2, and the fourth one is tire ID3.

Under a situation in which the steering angle is greater than or equal to the predetermined angle, the rotation amount cycle ordering unit 37 measures the rotation amount cycle Tpl for each rotation of the axles 18a to 18d. When the measurement of the rotation amount cycle Tpl is completed for all of the axles 18a to 18d, the rotation amount cycle ordering unit 37 compares and orders the cycles. When ordered from a shorter cycle, the first one is the right front axle 18a, the second one is the left rear axle 18d, the third one is the left front axle 18b, and the fourth one is the right rear axle 18c.

The position determination unit 30 associates the peak order obtained by the peak ordering unit 36 with the rotation cycle order obtained by the rotation amount cycle ordering unit 37 to determine the tire positions. Here, tire ID code ID1 is associated with the right front axle 18a, tire ID code ID4 is associated with the left rear axle 18d, tire ID code ID2 is associated with the left front axle 18b, and tire ID code ID3 is associated with the right rear axle 18c. As a result, the position determination unit 30 determines the mounting positions of the tires 2 having the tire ID codes ID1 to ID4.

In addition to advantages (1) to (23) of the first to seventh embodiments, the eighth embodiment has the advantages described below.

(24) The tire positions may be determined just by comparing the order of the peak-to-peak times Tpk with the order of the rotation amount cycles Tpl. Thus, the tire positions may be determined through a simple process. Further, even when there is an error in the actual measurement of the axle rotation amount C, the above comparison cancels such an error. This is advantageous for accurately determining the tire positions.

A ninth embodiment will now be described focusing on features that differ from the above embodiments.

Figures 32, 33:
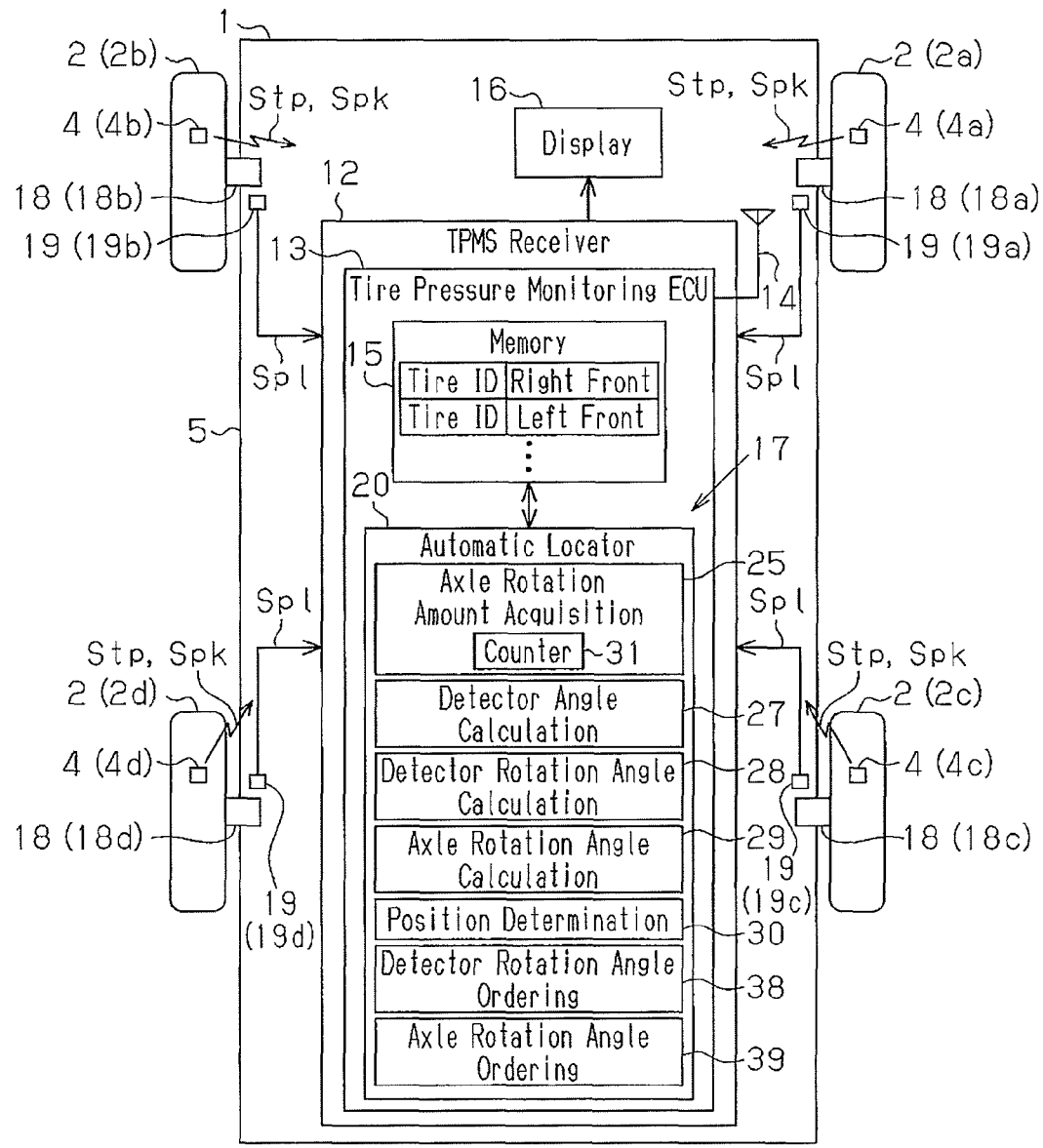
FIG. 32 is a schematic diagram illustrating the detector ration angle and the axle rotation angle in a ninth embodiment.
FIG. 33 is a schematic diagram illustrating a tire determination system of the ninth embodiment.

As shown in FIG. 32, the detector rotation angles θa corresponding to ID1 to ID4 may be "ID1: 0 degrees," "ID2: 45 degrees," "ID3: 20 degrees," and "ID4: 90 degrees." Further, the axle rotation angles θb of the axles 18a to 18d may be "right left: 0 degrees," "left front: 30 degrees," "left rear: 10 degrees," and "right rear: 120 degrees." Accordingly, the tire positions may be determined by comparing the orders of the detector rotation angle θa and the axle rotation angle θb.

Referring to FIG. 33, the automatic locator 20 includes a detector rotation angle ordering unit 38, which orders the rotation angles θa of the tire pressure detectors having tire ID codes ID1 to ID4, and an axle rotation angle ordering unit 39, which orders the axle rotation angles θb of the axles 18a to 18d. The position determination unit 30 compares the order of the detector rotation angle θa and the order of the axle rotation angle θb to determine the tire positions.

In the example of FIG. 32, the order of the detection rotation angle θa from smaller ones is "ID1," "ID3," "ID2," and "ID4." The order of the axle rotation angles θb from smaller ones is "right front," "left rear," "left front," and "right rear." The position determination unit 30 associates the orders to determine the tire positions. More specifically, "ID1" is determined as "right front," "ID3" is determined as "left rear," "ID2" is determined as "left front," and "ID4" is determined as "right rear."

In addition to advantages (1) to (24) of the first to eight embodiments, the ninth embodiment has the following advantage.

(25) The tire positions may be determined just by comparing the order of the detector rotation angles θa and the axle rotation angles θb. Thus, the tire positions may be determined with a simple process. Further, even when there is an error in the actual measurement of the axle rotation amount C, such an error may be cancelled by comparing the order. This is advantageous for accurately determining the tire positions.

A tenth embodiment will now be described focusing on differences from the above embodiment.

Figures 34, 35:
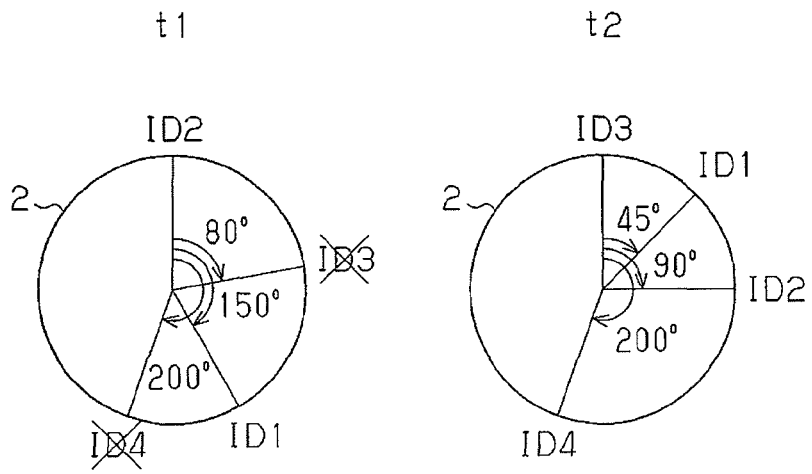
FIG. 34 is a schematic diagram illustrating a tire position determination method in a tenth embodiment.
FIG. 35 is a schematic diagram illustrating the tire position determination method in the tenth embodiment.

Referring to FIG. 34, due to wireless communication, the tire position determination system 17 may not be able to receive all four tire IDs and a certain ID may not be received. In the example shown in FIG. 34, at the first determination timing t1, only the notification signals Spk including the tire ID codes ID1 and ID2 are received. At the second determination timing t2, the notification signals Spk including the tire ID codes ID1 to ID4 are all received.

When determining tire positions by calculating the detector rotation angle θa of a predetermined tire ID based on a certain ID, even if a tire ID is not received, as long as the same tire ID is obtained at the first determination timing t1 and the second determination timing t2, the tire position for that tire ID may be determined. That is, as long as at least one ID is received at the first determination timing t1 and the second determination timing t2, the tire position corresponding to that ID may be determined. The present example uses this principle to determine tire positions.

The tire position determination will now be described with reference to FIGS. 34 to 36.

Referring to FIG. 34, when only the notification signals Spk including tire ID codes ID1 and ID2 are received at the first determination timing t1, if the twelve o'clock position is "0 degrees" when receiving the notification signal including the tire ID code ID2, the angle of the right front tire pressure detector 4a corresponding to the tire ID code ID1 is "150 degrees" based on the tire ID2. Further, when the notification signals Spk of the tire ID codes ID1 to ID4 are all received at the second determination timing t2, based on the angle of the right rear tire pressure detector having tire ID3, the angle of the right front tire pressure detector 4a having the tire ID code ID1 is "45 degrees," and the left front tire pressure detector 4b having the tire ID code ID2 is "90 degrees."

As shown in FIG. 35, the detector rotation angle calculation unit 28 calculates detector rotation angles θa between the first determination timing t1 and the second determination timing t2 from the difference of the detector angle θk1 during the first determination timing t1 and the detector angle θk2 during the second determination timing t2. Here, it may be determined that between the first determination timing t1 and the second determination timing t2, the tire ID code ID1 is rotated by 255 degrees, and the tire ID code ID2 is rotated by 90 degrees. The position determination unit 30 determines the tire position by comparing the detector rotation angle θa and the axle rotation angle θb. More specifically, the axle rotation angles θb of "255 degrees" and "90 degrees" are associated with the tire ID codes ID1 and ID2 of the axles 18 to determine the tire positions.

Position determination may not be performed on tire ID codes ID3 and ID4 that are not the same at the first determination timing t1 and the second determination timing t2. However, under the assumption that the vehicle 1 is travelling straight, as long as radio wave signals may be received from the tire pressure detectors 4 having the tire ID codes ID3 and ID4 at a determination timing that is one tire rotation after the first determination timing t1, notification signals Spk having the tire ID codes ID1 and ID2 are received at the first determination timing t1 and notification signals Spk having tire ID codes ID3 and ID4 are received one rotation after. This is equivalent to the tire ID codes for all wheels being obtained.

Figure 36:
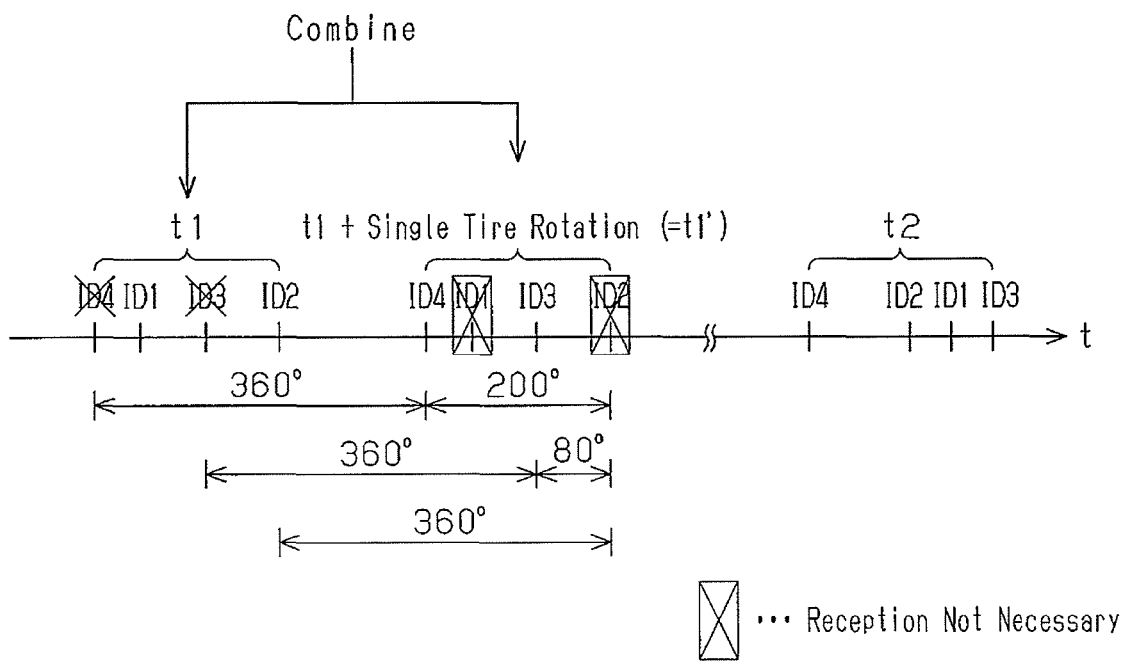
FIG. 36 is a timing chart illustrating a specific example of the determination of tire positions in the tenth embodiment.

Referring to FIG. 36, if the ID codes cannot be all acquired at the single first determination timing, under the assumption that the vehicle 1 is travelling straight, the detector rotation angle calculation unit 28 waits for a single rotation of the tire 2 and receives for a non-received ID code assumed to be transmitted one rotation after. Here, notification signals Spk having tire ID codes ID1 and ID2 are received at the initial first determination timing t1 and tire ID codes ID3 and ID4 are received at timing t1' that is one tire rotation after. The detector rotation angle calculation unit 28 combines the notification signal Spk that includes the tire ID codes ID1 and ID2 received at the first determination timing t1 and the notification signal Spk that includes the tire ID codes ID3 and ID4 received at the determination timing t1' to acquire all of the IDs that should be acquired at the first determination timing t1.

Based on all of the tire ID codes acquired at the first determination timings t1 and t1' and the tire ID codes received at the second determination timing t2, the position determination unit 30 calculates the detector rotation angle θa of each of the tire pressure detectors 4a to 4d. Further, the position determination unit 30 compares the detector rotation angle θa and the axle rotation angle θb to determine the tire position of each of the four wheels. Thus, when there are missing tire ID codes at the first determination timing t1, the tire positions of all four wheels may consequently be determined.

In the tenth embodiment, the advantages described below may be obtained in addition to advantages (1) to (25) of the first to ninth embodiments.

(26) Even when the tire ID codes are not acquired in a single determination process, positions are sequentially determined for the received tire ID codes. This is repeated to determine all of the tire ID codes. Thus, the acquirement of all of the ID codes for a single determination process is not a condition for completing the tire position determination. This is advantageous for every one of the tire positions at an early stage.

(27) Even when the tire ID codes are not acquired in a single determination process, position determination is performed for only the received ID codes, and position determination is subsequently performed for the tires of which positions could not be determined. By repeating the determination, the determination of the tire positions may be ultimately determined.

An eleventh embodiment will now be described focusing on features differing from the above embodiments.

Figure 37:
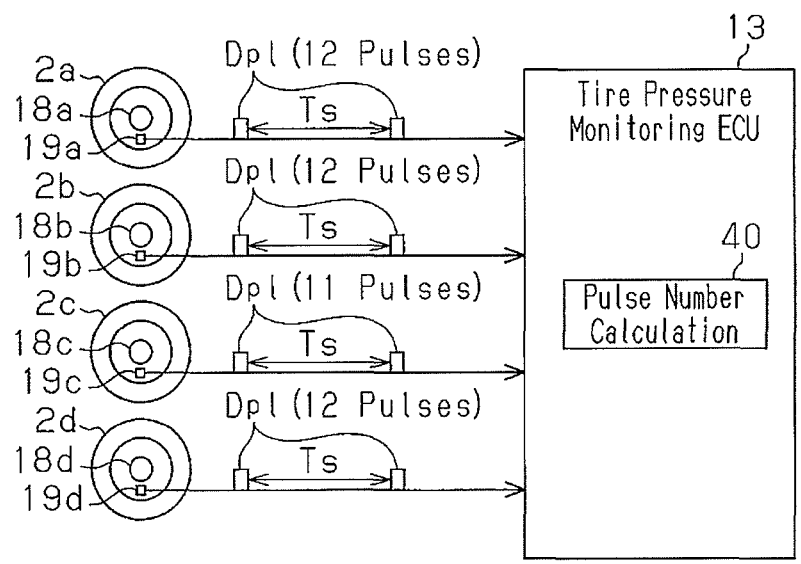
FIG. 37 is a schematic diagram illustrating a total pulse signal Dpl transmitted from an axle rotation amount sensor of a tire position determination system in an eleventh embodiment.

In some embodiments, each axle rotation amount sensor 19 is configured to output a pulse signal whenever detecting the passage of a tooth or a gap between adjacent teeth. For example, each axle rotation amount sensor 19 may output a total count number signal or a total pulse number signal Dpl corresponding to the sum of the number of count teeth passages and the number of gaps between adjacent teeth during a predetermined count period. In the example of FIG. 37, when the count number is 12 from when the previous pulse number signal Dpk is transmitted to when the predetermined count period Ts ends, each axle rotation amount sensor 19 transmits the count number of 12 as the present total pulse number signal Dpl. The total pulse number signal Dpl is sent to the tire pressure monitoring ECU 13 through, for example, a controller area network (CAN).

A tire ID that is peak-transmitted from the tire pressure detector 4 may be received from when the total pulse number signal Dpl is acquired to when the next total pulse signal Dpl is acquired. When the axle rotation amount sensor 19 outputs the total pulse number signal Dpl in the predetermined output intervals Ts, the pulse number cannot be known when a tire ID code is truly received. For example, when the pulse number acquired at a certain timing is "50," even though a tire ID code is received, for example, at pulse number "55," the next total pulse number signal may be acquired at the timing when the pulse number is "50+12=72," and the pulse number cannot be accurately acquired during tire ID code reception.

Thus, the tire pressure monitoring ECU 13 includes a pulse number calculation unit 40 that calculates the true pulse number when receiving a tire ID code from the ratio of the timing at which the tire ID code is received during an output interval Ts when waiting for the next total pulse number signal Dpl. When a tire ID code is received during the period of time of the output interval Ts, the pulse number calculation unit 40 checks when the tire ID code was received during that period of time to obtain the ratio of the reception timing of the tire ID code, and the ratio is used to calculate the true pulse number of the received tire ID code.

In one example, after "12 pulses" is input from the total pulse number signal Dpl, a notification signal Spk having tire ID1 is received before the next total pulse number signal Dpl is input. If the tire ID code ID1 is received when 10 ms elapses after the preceding total pulse number signal Dpl is input, the pulse number calculation unit 40 performs the calculation of 12 pulses×10 ms/30 ms=4 pulses. The pulse number calculation unit 40 adds "4" to "12" obtained from the preceding total pulse number signal Dpl to calculate the pulse number of "12+4=16" at the timing when the tire ID code ID1 is received. The same calculation is performed for the other tire ID codes ID2 to ID4.

The eleventh embodiment has the following advantage in addition to advantages (1) to (27) of the first to tenth embodiments.

(28) Even when the axle rotation amount sensor 19 outputs in fixed intervals the total of the pulse number measured during the predetermined time as the total pulse number signal Dpl, the tire position may be accurately determined.

A twelfth embodiment will now be described focusing on differences from the above embodiments.

Figure 38:
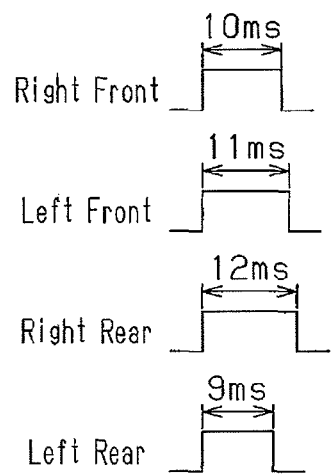
FIG. 38 is a waveform chart of the pulses output from an axle rotation amount sensor of a tire position determination system in a twelfth embodiment.

Referring to FIG. 38, for example, the average time until when the pulse number for each of the four wheels increases may be obtained, and the total of the pulse numbers of the four wheels may be used as pulses for the representative wheel 26. For example, the duration time length of a single pulse of the right front axle rotation amount sensor 19a is 10 ms, the duration time length of a single pulse of the left front axle rotation amount sensor 19b is 11 ms, the duration time length of a single pulse of the right rear axle rotation amount sensor 19c is 12 ms, and the duration time length of a single pulse of the left rear axle rotation amount sensor 19d is 9 ms. In this case, an average duration time length of 10.5 ms may be measured as the duration time length of a single pulse. This increases the calculation accuracy of the detector angle θk.

Figure 39:
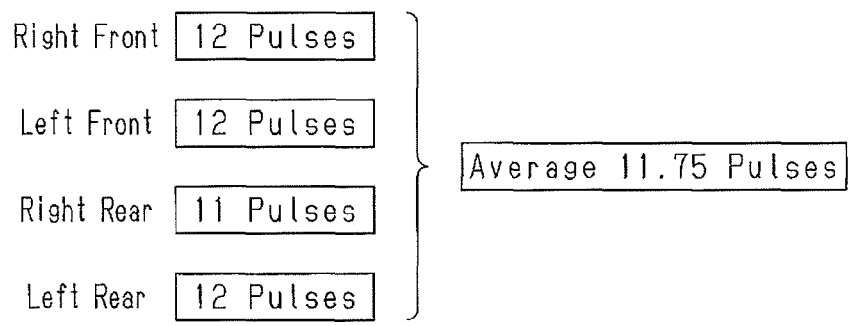
FIG. 39 is a schematic diagram illustrating an axle rotation amount sensor in a modified example.

When the axle rotation amount sensor 19 outputs the total pulse number measured during a predetermined time as the total pulse number signal Dpl, the calculation illustrated in FIG. 39 may be applied. For example, when right front is "12 pulses," left front is "12 pulses," right rear is "11 pulses," and left rear is "12 pulses," the average value of "11.75 pulses" may be calculated as the pulse number of the representative wheel 26. That is, even when the rotation speed slightly differs between the four wheels, the representative wheel 26 may be assumed as having been rotated by the average value of 11.75 pulses. The average value may be rounded off. For example, in this case, the average value may be rounded off to "12 pulses."

The tire ID codes are received as the pulses of the representative wheel 26 vary from 0 to 95. In one example, the pulse number of the representative wheel 26 when receiving the tire ID code ID4 is "83." In this case, if the pulse number of the representative wheel 26 when the total pulse number signal Dpl that is received is, for example, "79," when the next total pulse number signal Dpl is obtained, pulse number "12" is added and recognized as "91," and the true pulse number of "83" that is the true pulse number of the representative wheel 26 when the tire code ID4 is received cannot be acquired.

Thus, like the eleventh embodiment, when the tire ID code ID4 is received during the period from when a total pulse number signal Dpl is acquired to when the next total pulse signal Dpl is acquired, the true pulse number of the representative wheel 26 when the tire ID code ID4 is received may be calculated by obtaining the ratio of the wait time when the tire ID is received. When, for example, 10 ms has elapsed from when the preceding total pulse number signal Dpl has been received, 12 pulses×10 ms/30 ms=4 pulses is calculated. Then, by adding "4" to "79," which is the preceding total pulse number signal Dpl, the pulse number at the timing at which tire ID code ID1 of the representative wheel is received is calculated as "12+4=16."

In addition to advantages (1) to (28) of the first to eleventh embodiments, the twelfth embodiment has the following advantage.

(29) The pulse number of the representative wheel 26 may be accurately calculated. This is advantageous for improving the tire position determination accuracy.

It should be apparent to those skilled in the art that the present invention may be embodied in many other specific forms without departing from the spirit or scope of the invention. Particularly, it should be understood that the present invention may be embodied in the following forms.

Figure 40:
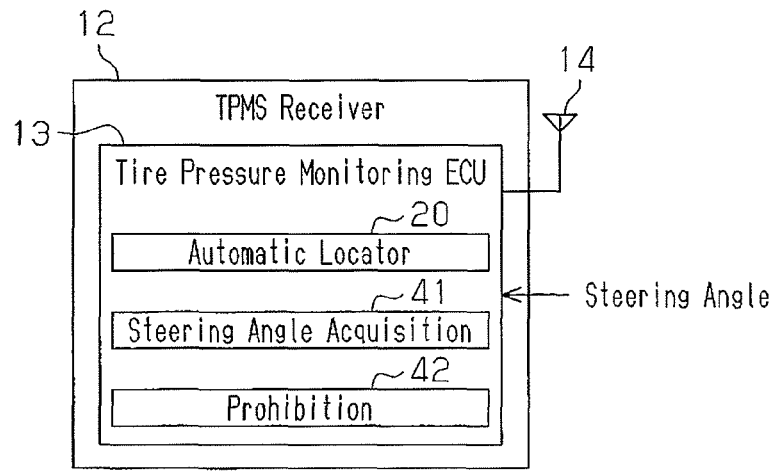
FIG. 40 is a diagram showing the structure of a receiver in a further example.

In the above embodiments, referring to FIG. 40, execution of the tire position determination of the present example may be suspended when the steering wheel is greater than or equal to a predetermined angle. In this case, the tire pressure monitoring ECU 13 includes a steering angle acquisition unit 41, which acquires steering angle information of the steering wheel, and a prohibition unit 42, which prohibits execution of the tire position determination by the automatic locator 20. Thus, when the steering wheel is rotated by a certain amount or greater, that is, when the rotation amount difference between an inner wheel and an outer wheel is large, the tire position determination is not performed. Under a situation when assumed that a large error will be produced in the calculated angle, the tire position determination is not performed. The threshold for steering wheel determination is set so that, for example, the rotation amount difference between an inner wheel and an outer wheel is a value that may be tolerated as an error by the entire tire position determination system 17 (e.g., several degrees to several tens of degrees).

In the above embodiments, the transmission of the notification signal Skp includes a case when a notification is issued after a certain delay time elapses from when a characteristic point is detected in, for example, the centripetal component of gravity. That is, the notification signal Spk does not have to be issued the moment a characteristic point is generated and may be generated after the tire is rotated by a certain angle from when a peak is detected.

In each of the above embodiments, the execution of the tire position determination is not limited to low speeds and may be executed when the speed is high, for example, when the influence of centrifugal force is corrected to calculate the peak value and the moment a peak is obtained may be transmitted through wireless communication without any interference. For example, the rotation speed is obtained from the pulse signal Spl of the axle rotation amount sensor 19. This allows for calculation of the centrifugal force applied to the tire 2. Thus, the centrifugal force may be estimated through a calculation and the corrected value may be reflected to the peak. This allows for the centrifugal force component to be cancelled from the peak. To prevent interference of the radio wave signal, for example, the frequency of each radio wave signal of the four wheels may be switched, and frames may be shortened as long as the ID codes may be determined (exclude pressure data and temperature data).

In each of the above embodiments, the acceleration sensor 10 may be a single axis sensor that detects only the centripetal component of gravity Gr in the direction toward the axle or a dual axis sensor that detects the centripetal component of gravity Gr and a rotation direction component.

In each of the above embodiments, the detector rotation angle θa may be calculated from the sum or difference of θk1 and θk2.

In the above embodiments, the contents of each operation mode may be changed.

In the above embodiments, the automatic location preparation mode may be omitted.

In the above embodiments, the centripetal component of gravity detection unit is not limited to the acceleration sensor 10 and may be any sensor as long as the centripetal component of gravity applied to the tire pressure detector 4 may be detected.

In the above embodiments, the axle rotation amount sensor 19 is not limited to the ABS sensor as long as the rotation amount of the axle 18 may be detected.

In the above embodiments, the radio wave signals transmitted in constant intervals from the tire pressure detector 4 may have the same frame contents or different frame contents in each mode.

In the above embodiments, execution of the automatic location is not limited to when the vehicle 1 stops. The automatic location may be performed, for example, when the vehicle 1 starts to travel. In this case, reversed rotation of the tire 2 that may occur when the vehicle stops does not have to be taken into consideration. Thus, the tire position determination accuracy is high.

In the above embodiments, the automatic location (e.g., calculation of the detector angle θk) may be determined in any manner as long as the centripetal component of gravity is used.

In the above embodiments, the radio wave signal transmitted from the tire pressure detector 4 when determining a tire position may be, for example, a tire pressure signal Stp as long as it includes at least the tire ID code.

In the above embodiments, it is preferable that the certain directional component of gravity that varies be the characteristic point of the centripetal component of gravity. Instead, the certain directional component of gravity may be variations in the physical amount related with the certain directional component of gravity that varies in accordance with the tire rotation.

In the above embodiments, for example, when the output of the acceleration sensor 10 (centripetal component of gravity Gr) takes a positive absolute value regardless of the centrifugal force, the tire position may be determined as described below. For example, when the tire pressure detector 4 transmits a notification signal Spk and the vehicle 1 subsequently stops (or is slow enough to be considered as having been stopped), the tire pressure detector 4 transmits the centripetal component of gravity Gr to the receiver 12. In this case, as long as there is a steering angle, there should be a difference in the values of the pulse numbers of the axles 18 from when a notification signal Spk is received to when the vehicle stops. Since the values may be associated with the wheels, the axle rotation angle θb calculated from the axle rotation amount of each of the axle rotation amount sensors 19a to 19d may be compared with the detector rotation angle θa calculated from the centripetal component of gravity Gr to determine the tire position.

In the sixth embodiment, the time origin point T0 is not limited to the time when the centripetal component of gravity Gr first becomes greater than or equal to threshold Gth1 and may be, for example, a time when the cycle is further shortened. In other words, the time origin point T0 may be set anywhere.

In the sixth embodiment, the sampling cycle of the centripetal component of gravity Gr may be set to a length determined by the absolute value of the acceleration sensor and a certain coefficient (e.g., inverse proportion coefficient).

In the sixth embodiment, if the period from the time origin point T0 to when the automatic location is completed ends (after 20 minutes elapses from the time origin point T0 or after 40 transmissions), each tire pressure detector 4 receives a radio wave signal at an accurate timing when the characteristic point is detected once for the first time. Otherwise, each tire pressure detector 4 may perform a transmission at a different timing.

In the sixth embodiment, the measured rotation cycle is not limited to Ta that sets a single tire rotation as a single cycle and may be, for example, Ta/2 of one half of a rotation.

In the tire position determination system of some embodiments, the timing for calculating the detector angle is the moment the receiver receives the radio wave signal from every one of the tire pressure detectors.

In the tire position determination system of some embodiments, whenever receiving the radio wave signal, the detector angle calculation unit stores the axle rotation amount of the representative wheel associated with the detector ID included in the radio wave signal. After storing the axle rotation amount associated with an detector ID included in the radio wave signal, the axle rotation amount of the representative wheel at the first determination timing and the stored axle rotation amount are used to obtain the detector angle of each tire pressure detector, and the axle rotation amount of the representative wheel at the second determination timing and the stored axle rotation amount are used to obtain the detector angle of each tire pressure detector.

In the tire position determination system of some embodiments, after receiving a first radio wave signal from the first tire pressure detector, when the detector angle calculation unit receives a second radio wave signal from the second tire pressure detector, the detector angle calculation unit calculates the angle difference between the first tire pressure detector and the second tire pressure detector based on variations in the axle rotation amount of the representative wheel measured during a period from when the first radio wave signal is received to when the second radio wave signal is received. The detector angle calculation unit repeats the calculation of the angle difference whenever a new radio wave signal is received and calculates the detector angle of each tire pressure detector based on the angle difference. The angle calculation is performed at the first determination timing and the second determination timing.

In the tire position determination system of some embodiments, the detector angle calculation unit calculates an average value of the axle rotation amounts indicated by the detection signals output from the axle rotation amount sensors. Then, the detector angle calculation unit uses the average value to calculate the axle rotation amount.

The present examples and embodiments are to be considered as illustrative and not restrictive, and the invention is not to be limited to the details given herein, but may be modified within the scope and equivalence of the appended claims.

The invention claimed is:

1. A tire position determination system, comprising:
a plurality of tire pressure detectors respectively attached to tires on wheels of a vehicle; and
a receiver coupled to a vehicle body of the vehicle, wherein the receiver is configured to receive a tire pressure signal from each tire pressure detector and monitor the pressure of the corresponding tire based on the tire pressure signal;
wherein each tire pressure detector includes
a unique detector ID,
a gravity component detection unit that detects a certain directional component of gravity and generates a detection signal, and
a transmission control unit that transmits a radio wave signal including the detector ID based on the detection signal of the gravity component detection unit; and
the receiver includes
an interface that communicates with axle rotation amount sensors, wherein each axle rotation amount sensor corresponds to an axle of a plurality of axles connected to the wheels of the vehicle and detects an axle rotation amount of the corresponding axle, and
a tire mounting position determination processing unit that acquires the detector ID whenever receiving the radio wave signal from each tire pressure detector and the axle rotation amount detected by each axle rotation amount sensor, associates the detector IDs with the axle rotation amounts, and determines mounting positions of the tires on the axles based on the axle rotation amounts associated with the detector IDs of the tire pressure detectors.

2. The tire position determination system according to claim 1,
wherein the detection signal of the gravity component detection unit is indicative of a characteristic point when one of the tire pressure detectors is located at an uppermost position or lowermost position of the corresponding tire.

3. The tire position determination system according to claim 2,
wherein the transmission control unit is configured to transmit the radio wave signal when detecting a characteristic point in the detection signal of the gravity component detection unit.

4. The tire position determination system according to claim 1,
wherein the transmission control unit is configured so that after time elapses from when the radio wave signal is transmitted, during which a rotation amount difference occurs between a first wheel among the wheels of the vehicle and a second wheel among the wheels of the vehicle, the transmission control unit transmits a next radio wave signal.

5. The tire position determination system according to claim 1, wherein
the transmission control unit is configured to transmit the radio wave signal at each of a first determination timing and a second determination timing, which is delayed from the first determination timing by an interval;
the tire mounting position determination processing unit is configured to
calculate a first detector angle using the axle rotation amount at the first determination timing,
calculate a second detector angle using the axle rotation amount at the second determination timing,
calculate a detector rotation angle from the first and second detector angles,
calculate an axle rotation angle from the axle rotation amount at the first determination timing and the axle rotation amount at the second determination timing, and
compare the detector rotation angle and the axle rotation angle to determine the mounting positions of the tires.

6. The tire position determination system according to claim 5,
wherein the tire mounting position determination processing unit is configured to
acquire an axle rotation amount of one of the wheels from one of the axle rotation amount sensors when receiving the radio wave signal from a corresponding one of the tire pressure detectors,
calculate the first and second detector angles using the axle rotation amount of the representative wheel, and
determine the mounting positions of the tires using the calculated detector angles.

7. The tire position determination system according to claim 5, wherein
the tire mounting position determination processing unit is configured so that when receiving a first radio wave signal having a first detector ID and then a second radio wave signal having a second detector ID, the tire mounting position determination processing unit calculates and stores an angle of one of the tire pressure detectors having one of the first and second detector IDs relative to another of the tire pressure detectors having the other one of the first and second detector IDs, and the tire mounting position determination processing unit is configured to determine the mounting positions of one and another of the tires using the stored detector angles respectively corresponding to the one and the another of the tire pressure detectors.

8. The tire position determination system according to claim 5, wherein the transmission control unit is configured to transmit the radio wave signal at least once at each of the first determination timing and the second determination timing, and the tire mounting position determination processing unit is configured to compare the detector rotation angle and the axle rotation angle.

9. The tire position determination system according to claim 5, wherein the tire mounting position determination processing unit is configured to determine the tire mounting positions by comparing a plurality of detector rotation angles respectively corresponding to the tires with a plurality of axle rotation angles respectively corresponding to a plurality of axles.

10. The tire position determination system according to claim 5, wherein when one of the detector IDs is included in at least one radio wave signal received at the first determination timing and is included in at least one radio wave signal received at the second determination timing, the tire mounting position determination processing unit is able to determine the mounting position of the tire corresponding to the one of the detector IDs.

11. The tire position determination system according to claim 10, wherein when the mounting position of one of the tires corresponding to one of the detector IDs cannot be determined and the vehicle is travelling straight, the tire mounting position determination processing unit waits until the one of the tires corresponding to the one of the detector IDs rotates once; and the tire mounting position determination processing unit is configured to determine the mounting position of the one of the tires corresponding to the one of the detector IDs when a time for the one of the tires to rotate once from the first determination timing elapses.

12. The tire position determination system according to claim 1, wherein each tire pressure detector includes a travel status determination unit that determines a travel status of the vehicle based on a detection signal of the gravity component detection unit, and the travel status determination unit is configured to transmit the radio wave signal when determining that a velocity of the vehicle is within a predetermined velocity range.

13. The tire position determination system according to claim 12, wherein the tire mounting position determination processing unit stores a reception interval time at which two consecutive radio wave signals that include the same detector ID are received, in association with the same detector ID;

the tire mounting position determination processing unit stores, for each of the plurality of axles, a time until an axle rotation amount corresponds to a single tire rotation of one of the tires; and the tire mounting position determination processing unit determines the tire mounting positions by comparing a plurality of reception interval times respectively corresponding to a plurality of detector IDs with the times until the axle rotation amounts correspond to a single tire rotation.

14. The tire position determination system according to claim 1, wherein the transmission control unit is configured to transmit the radio wave signal if a length of time from when the detection signal of the gravity component detection unit indicates that one of the tire pressure detectors is located at a certain position to the next time when the detection signal of the gravity component detection unit indicates that the one of the tire pressure detectors is located at the certain position is longer than or equal to a predetermined time.

15. The tire position determination system according to claim 1, wherein each tire pressure detector includes a travel status determination unit that determines a travel status of the vehicle based on a detection signal of the gravity component detection unit, and an operation mode switching unit that switches an operation mode of one of the tire pressure detectors based on a vehicle velocity of the vehicle, a first threshold, and a second threshold that is smaller than the first threshold, wherein the vehicle velocity is determined by the travel status determination unit; and the operation mode switching unit switches the one of the tire pressure detectors to a pressure determination mode for monitoring tire pressure when the vehicle velocity is higher than or equal to the first threshold, switches the one of the tire pressure detectors to an automatic location preparation mode to increase the frequency for determining the vehicle velocity when the vehicle velocity is between the first threshold and the second threshold, and switches the one of the tire pressure detectors to an automatic location mode when the vehicle velocity is less than the second threshold.

16. The tire position determination system according to claim 1, wherein the transmission control unit is configured to transmit the radio wave signal in fixed intervals when the detection signal of the gravity component detection unit indicates that one of the tire pressure detectors is located at a specific predetermined rotation position regardless of a rotation speed of one of the corresponding tires or when the vehicle is travelling at a constant vehicle velocity.

17. The tire position determination system according to claim 1, wherein the transmission control unit is configured to calculate a tire rotation cycle during which one of the tires rotates once based on variations in the detection signal of the gravity component detection unit, and the certain directional component is sampled in a sampling cycle and the tire rotation cycle, and the sampling cycle is less than one-half of the tire rotation cycle.

18. The tire position determination system according to claim 1, wherein the certain directional component cyclically varies as the corresponding tire rotates;

the transmission control unit includes a determination range and a rotation cycle range, wherein the determination range has a width that takes into consideration a detection accuracy of the gravity component detection unit;

when the certain directional component exceeds the determination range, the transmission control unit starts measuring time of a cycle of the certain directional component to measure a cycle of a rotation of one of the tires; and the transmission control unit is configured to transmit the radio wave signal when the measured cycle of a rotation of the one of the tires is in the rotation cycle range.

19. The tire position determination system according to claim 18, wherein the determination range of the certain directional component is one of a plurality of different determination ranges, and the transmission control unit switches the sampling cycle in accordance with the rotation cycle of the one of the tires determined based on a selected one of the determination ranges.

20. The tire position determination system according to claim 1, wherein the certain directional component cyclically varies as the corresponding tire rotates;

the transmission control unit sets a threshold for a directional component of gravity to account for rough accuracy of the gravity component detection unit; and when the certain directional component exceeds the threshold for a directional component of gravity, the transmission control unit starts measuring a tire rotation cycle of a single rotation of one of the tires.

21. The tire position determination system according to claim 1, wherein the tire mounting position determination processing unit is configured to determine the tire mounting positions by checking whether an axle rotation amount of a single tire rotation conforms to an axle rotation amount measured from when the radio wave signal is received at a first determination timing to when the radio wave signal is received at a second determination timing.

22. The tire position determination system according to claim 1, wherein the axle rotation amount sensor outputs a first total pulse number signal that indicates a total pulse number counted during a first predetermined interval and a second total pulse number signal that indicates a total pulse number counted during a second predetermined interval that includes the first predetermined interval; and when the tire mounting position determination processing unit receives a detector ID during a period from when the first total pulse number signal is received to when the second total pulse number signal is received, the tire mounting position determination processing unit is configured to calculate an updated pulse number when the detector ID is received from a ratio of a length of time from when the first total pulse number signal is received to when the detector ID is received and a length of time from when the detector ID is received to when the second total pulse number signal is received.

23. The tire position determination system according to claim 22, wherein the tire mounting position determination processing unit is configured to calculate an average value from a total pulse number indicated by a plurality of total pulse number signals output from a plurality of axle rotation amount sensors and use the average value as an axle rotation amount of a representative wheel to calculate a detector angle.

24. The tire position determination system according to claim 1, further comprising:

a steering angle acquisition unit that acquires a steering angle of a steering wheel of the vehicle; and a prohibition unit that stops processing by the tire mounting position determination processing unit when the steering angle is greater than or equal to a threshold.

25. A tire pressure monitoring system, comprising:

tire pressure detectors respectively attached to tires, wherein each tire pressure detector transmits a tire pressure signal, which is in accordance with the pressure of the corresponding tire, and a radio wave signal, which differs from the tire pressure signal;

a receiver coupled to a vehicle body, wherein the receiver is configured to receive a tire pressure signal from each tire pressure detector and monitor the pressure of the corresponding tire based on the tire pressure signal; and a display unit;

wherein each tire pressure detector includes
a unique detector ID,
an acceleration sensor that outputs a detection signal indicative of a centripetal component of gravity, which varies as the corresponding tire rotates, and
a transmission control unit that transmits the radio wave signal including the detector ID at controlled times, or when the detection signal of the acceleration sensor indicates that one of the tire pressure detectors is located at a certain rotation position; and the receiver includes
an interface that communicates with axle rotation amount sensors, wherein each axle rotation amount sensor detects an axle rotation amount of a corresponding axle, and
a tire mounting position determination processing unit that acquires the detector ID whenever receiving the radio wave signal from each tire pressure detector and the axle rotation amount detected by each axle rotation amount sensor, associates the detector IDs with the axle rotation amounts, and determines mounting positions of the tires based on the axle rotation amounts associated with the detector IDs of the tire pressure detectors, wherein the receiver is configured to show a warning on the display unit indicating a pressure decrease in at least one tire in accordance with determination of the mounting positions of the tires by the tire mounting position determination processing unit.

* * * * *